(12) United States Patent
Xue

(10) Patent No.: US 11,187,535 B1
(45) Date of Patent: Nov. 30, 2021

(54) ATTITUDE MEASUREMENT METHOD

(71) Applicant: INSTITUTE OF GEOLOGY AND GEOPHYSICS, CHINESE ACADEMY OF SCIENCES, Beijing (CN)

(72) Inventor: Xu Xue, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/248,896

(22) Filed: Feb. 12, 2021

Related U.S. Application Data

(63) Continuation of application No. PCT/CN2020/090520, filed on May 15, 2020.

(30) Foreign Application Priority Data

May 11, 2020 (CN) .......................... 202010394138.X

(51) Int. Cl.
*E21B 47/022* (2012.01)
*G01C 21/20* (2006.01)
*G01C 21/16* (2006.01)

(52) U.S. Cl.
CPC ............ *G01C 21/16* (2013.01); *E21B 47/022* (2013.01); *G01C 21/20* (2013.01)

(58) Field of Classification Search
CPC ...... G01C 21/16; G01C 21/20; G01C 25/005; G01C 19/00; E21B 47/022
(Continued)

(56) References Cited

U.S. PATENT DOCUMENTS 4,303,978 A * 12/1981 Shaw ..................... G01C 21/16
244/177
4,542,647 A * 9/1985 Molnar ................. E21B 47/022
73/152.54

(Continued)

*Primary Examiner* — John E Breene
*Assistant Examiner* — Jeffrey P Aiello
(74) *Attorney, Agent, or Firm* — Grossman, Tucker, Perreault & Pfleger. PLLC

(57) ABSTRACT

An attitude measurement method, which relates to the technical field of measurement while drilling in directional drilling, which can improve the observability of inertial instrument errors, suppress the repeatability errors of gyroscopes and improve the attitude measurement accuracy. The method adopts the method of fine alignment at multiple positions to carry out initial alignment; the method includes the steps of: S1, taking current attitude data and velocity data of the strapdown inertial navigation system as first initial values, and performing fine alignment at a first position; S2, changing the position of a strapdown inertial navigation system to an nth position, and performing attitude update and velocity update according to the last fine alignment result in the position changing process; and S3, taking the results of attitude update and velocity update as the nth initial values, performing the nth fine alignment at the nth position to complete the initial alignment of the strapdown inertial navigation system, thereby realizing attitude measurement. The solution of the present invention is suitable for measuring the horizontal attitude and azimuth of the whole inclined section of a horizontal well, especially the application of directional drilling gyro measurement while drilling in the attitude measurement of large inclined wells and horizontal wells.

13 Claims, 24 Drawing Sheets

(58) Field of Classification Search
USPC ........ 73/1.75, 1.79; 702/9, 92–94, 104, 141, 702/150–151
See application file for complete search history.

(56) References Cited

U.S. PATENT DOCUMENTS

| | | | | |
|---|---|---|---|---|
| 6,453,239 | B1* | 9/2002 | Shirasaka | G01C 21/16 701/508 |
| 8,458,140 | B2* | 6/2013 | Zeibak | G06F 16/21 707/688 |
| 2007/0282529 | A1* | 12/2007 | Thompson | G01C 25/00 701/510 |
| 2009/0018798 | A1* | 1/2009 | Dorneich | G06Q 30/0202 702/179 |
| 2009/0171585 | A1* | 7/2009 | Hoshizaki | G01C 21/16 701/480 |
| 2009/0326740 | A1* | 12/2009 | Wang | G01C 23/00 701/3 |
| 2016/0047675 | A1* | 2/2016 | Tanenhaus | G01C 25/005 702/104 |
| 2020/0309564 | A1* | 10/2020 | Shakibay Senobari | G01C 21/18 |

* cited by examiner

ATTITUDE MEASUREMENT METHOD

FIELD

The present invention relates to the technical field of directional drilling attitude measurement, in particular to an attitude measurement method for large inclined wells and horizontal wells and a directional drilling gyro measurement while drilling method.

BACKGROUND

At present, with the gradual extension of the world exploration field to complex areas and special environments, the development difficulty and cost will greatly increase. The exploration and development situation promotes the evolution and development of well types, and the proportion of wells with complex structures such as extended reach wells, ultra-thin reservoir horizontal wells and multi-branch wells in oil and gas field exploration and development is increasing. With the development of steerable drilling technology represented by rotary steering technology, especially for applications in deep and ultra-deep steerable drilling, the requirements for well trajectory control accuracy are constantly improving.

The demands for advanced gyroscopes in oil exploration and development are that: gyroscopes that meet the requirements for high temperature and strong vibration and have a small volume and a high precision have always been the unswerving pursuit of the inertial technology in the oil industry. Especially in the case of interference of fluxgate during directional drilling, it is not that there is no need for gyroscopes at present, but rather there is no suitable gyroscope product which can work normally for a long time in harsh environments such as a high temperature and strong vibration. As to a gyroscope-related technology applied in steerable drilling, the reliability in harsh environment is an important basis for selection, so it is necessary to develop a kind of attitude measurement method that can meet the requirements for the most demanding use scenarios in the field of oil drilling survey, to solve the problems of environmental adaptability under high temperature and strong vibration environments, and bias repeatability.

The existing calibration methods only start from the differences in external environment interference suppression ability, calculation amount and other perspectives, and do not consider the large drift error of inertial instrument caused by the specific use environment for Gyro Measurement while Drilling (GMD), i.e., harsh environment such as a high temperature and strong vibration. However, the actually existing drift error of inertial instrument will affect the calibration accuracy of existing calibration methods. Under the harsh environment of a high temperature and strong vibration, the bias repeatability error is the main bottleneck restricting the accuracy of a gyroscope.

Therefore, it is necessary to develop an attitude measurement method to deal with the shortcomings of the prior art, so as to solve or alleviate one or more of the above problems and improve the construction accuracy of well trajectory.

SUMMARY

In view of the above, the present invention provides an attitude measurement method, which has the ability of fault tolerance and alignment under slight sloshing, and can improve the observability of inertial instrument errors without changing the precision of the inertial instrument itself, and suppress the repeatability error of the gyroscope when started successively, thus improving the accuracy of attitude measurement.

In one aspect, the present invention provides an attitude measurement method, used for a strapdown inertial navigation system, wherein repeatability drift of a gyroscope is suppressed by adopting a method of performing fine alignment at a plurality of positions respectively;

the method includes the steps of:

S1, taking current attitude data and velocity data of the strapdown inertial navigation system as first initial values, and performing first fine alignment at a first position;

S2, changing the position of the strapdown inertial navigation system to an nth position, and performing attitude update and velocity update according to a result of an (n−1)th fine alignment in an position changing process; and S3, taking results of the attitude update and velocity update as nth initial values, and performing an nth fine alignment at the nth position to complete an initial alignment of the strapdown inertial navigation system;

wherein, n is incremented by 1 from 2, and steps S2 and S3 are repeated until n=k; k is the number of positions selected by the method, and k is greater than or equal to 2.

The above-mentioned aspect and any possible implementations further provide an implementation: the plurality of positions are specifically two positions, i.e., k=2.

The above-mentioned aspect and any possible implementations further provide an implementation: the fine alignment is realized by Kalman algorithm.

The above-mentioned aspect and any possible implementations further provide an implementation: the fine alignment using Kalman algorithm comprises: time update and/or measurement update;

the time update refers to completing update of a state variable according to real-time data collected by the system, including attitude update and velocity update;

the measurement update refers to correcting an error of a state update with measurement data to realize optimal estimation.

The Kalman filter uses a velocity measurement after zero-speed correction and an angular rate measurement constrained by the earth rotation angular rate for the measurement update and optimal estimation, so as to improve alignment accuracy.

The above-mentioned aspect and any possible implementations further provide an implementation: when the method is used for drilling measurement, the data of initial value of the fine alignment includes a well inclination angle, a tool face angle and an azimuth angle.

The above-mentioned aspect and any possible implementations further provide an implementation: the measurement update includes the steps of:

1) judging whether a measurement data value is valid, if the measurement data value is valid, entering step 2), otherwise, performing no update, and taking a result of the time update as a final result of the Kalman filter; and 2) updating a result of the state update according to the measurement data value, calculating a gain coefficient according to an updating result and the result of the time update to obtain optimal state estimation.

The above-mentioned aspect and any possible implementations further provide an implementation: judging whether the measurement data value is valid is realized by judging whether a drill collar is in a static state and/or whether external disturbance meets an alignment requirement; if the drill collar is in the static state and/or the external disturbance meets the alignment requirement, it is determined that the measurement data value is valid, otherwise it is determined that the measurement data value is invalid.

The above-mentioned aspect and any possible implementations further provide an implementation: judging whether the drill collar is in the static state specifically comprises: judging whether a sensing-velocity observation value and/or a sensing-angular-rate observation value is less than a judgment threshold; if the sensing-velocity observation value and/or the sensing-angular-rate observation value is less than the judgment threshold, judging that the drill collar is in the static state; otherwise, judging that the drill collar is not in the static state.

The above-mentioned aspect and any possible implementations further provide an implementation: judging whether the external disturbance meets the alignment requirement specifically comprises: judging whether a disturbance amount of external mud or a vibration amount sensed by a vibration sensor is less than a set threshold value; if the disturbance amount of external mud or the vibration amount sensed by the vibration sensor is less than the set threshold value, judging that the external disturbance amount meets the alignment requirement, otherwise judging that the external disturbance amount does not meet the alignment requirement;

the specific values of the thresholds in the above judgment conditions are determined according to the actual conditions such as the drilling geological environment and depth.

The above-mentioned aspect and any possible implementations further provide an implementation: the sensing-velocity observation value is a real-time acceleration value of the gyroscope; the sensing-angular-rate observation value is a root mean square value of the angular rate of the gyroscope.

The above-mentioned aspect and any possible implementations further provide an implementation: the step 2) specifically comprises: according to a sequential processing method, respectively solving a measurement equation composed of a velocity measurement $Z_v$ after zero-speed correction and an angular rate measurement $Z_\omega$ constrained by the earth rotation angular rate, so as to realize constant drift error optimal estimation of X and Y horizontal gyroscopes and constant drift error estimation of a Z-axis gyroscope, and finally complete optimal estimation of an attitude and an azimuth misalignment angle.

The above-mentioned aspect and any possible implementations further provide an implementation: one-step state prediction and one-step mean square error prediction are completed during the time update.

The above-mentioned aspect and any possible implementations further provide an implementation: the attitude update in the position changing process is carried out by a quaternion method.

The above-mentioned aspect and any possible implementations further provide an implementation: the measurement method further comprises coarse alignment at the first position, and performs the first fine alignment using a result of the coarse alignment as the first initial values.

The above-mentioned aspect and any possible implementations further provide an implementation: the Kalman state equation is specifically: $\dot{X}=FX+W$ where, $$F = \begin{bmatrix} 0_{3\times 3} & f^n\times & 0_{3\times 3} & C_b^n \\ 0_{3\times 3} & -\omega_{ie}^n\times & -C_b^n & 0_{3\times 3} \\ 0_{3\times 3} & 0_{3\times 3} & 0_{3\times 3} & 0_{3\times 3} \\ 0_{3\times 3} & 0_{3\times 3} & 0_{3\times 3} & 0_{3\times 3} \end{bmatrix},$$

-continued $$W = \begin{bmatrix} C_b^n \nabla_w^b \\ -C_b^n \varepsilon_w^b \\ 0_{3\times 1} \\ 0_{3\times 1} \end{bmatrix}$$

$\nabla_w^b$ and $\varepsilon_w^b$ are random white noises of the accelerometer and gyroscope in a body coordinate system, respectively; $C_b^n$ is the attitude transition matrix of a navigation coordinate system and the body coordinate system; X and $\dot{X}$ represent Kalman filter state variables;

$X=[(\delta v^n)^T(\Phi^n)^T(\varepsilon_0^b)^T(\nabla_0^b)^T]^T.$ $\omega_{ie}^n=[0\ \omega_{ie}\cos L\ \omega_{ie}\sin L]^T;$ $\delta v^n$ is the velocity error, $\Phi^n$ is the mathematical platform misalignment angle of strapdown inertial navigation, $\varepsilon_0^b$ is the constant drift of the gyroscope, $\nabla_0^b$ is the constant bias of the accelerometer; $\omega_{ie}$ the angular rate of earth rotation; L is latitude; T represents the transposition of the matrix;

$f^*=[0\ 0\ g]$, g is the acceleration of gravity;

the attitude transition matrix $C_b^n$ of the navigation coordinate system and the body coordinate system is as follows:

$$C_b^n = \begin{bmatrix} \cos\psi\cos\gamma + \sin\psi\sin\theta\sin\gamma & \sin\psi\cos\theta & \cos\psi\sin\gamma + \sin\psi\sin\theta\cos\gamma \\ -\sin\psi\cos\gamma + \cos\psi\sin\theta\sin\gamma & \cos\psi\cos\theta & -\sin\psi\sin\gamma + \cos\psi\sin\theta\cos\gamma \\ -\cos\theta\sin\gamma & \sin\theta & \cos\theta\cos\gamma \end{bmatrix}$$

where, $\theta$ represents a pitch angle, $\psi$ represents a yaw angle, and $\gamma$ represents a roll angle.

The above-mentioned aspect and any possible implementations further provide an implementation: the formula for the time update includes:

an equation for one-step state prediction: $\hat{X}_{k/k-1}=\Phi_{k/k-1}\hat{X}_{k-1/k-1}$;

and an equation for one-step mean square error prediction: $P_{k/k-1}=\Phi_{k/k-1}P_{k-1/k-1}\Phi_{k/k-1}^T+\Gamma_{k/k-1}Q_{k-1}\Gamma_{k/k-1}^T$.

The above-mentioned aspect and any possible implementations further provide an implementation: the formula used for update of velocity measurement is:

an equation for velocity measurement: $Z_v=\delta v^n=H_v X+V_v$, where, $H_v=[I_{3\times 3}\ 0_{3\times 3}\ 0_{3\times 3}\ 0_{3\times 3}]$.

The formula used for update of the earth rotation angular rate measurement is:

an equation for earth rotation angular rate measurement: $Z_\omega=[I_{3\times 3}\ \omega_{ie}^n\times C_b^n\ 0_{3\times 3}]X+V_\omega$;

where, $V_v$ is the velocity measurement noise in the navigation coordinate system;

$V_\omega$ is the angular rate measurement noise;

$v^n$ is an output velocity, $\delta v^n$ is a velocity error, and is used as measurement data, I is a unit matrix, $Z_\omega$ is an angular-rate observation value and Z is a velocity observation value.

The above-mentioned aspect and any possible implementations further provide an implementation: the formula for calculating the gain of the Kalman filter is:

Kalman filter gain equation (5.5): $K_k=P_{k/k-1}H_k^T(H_k P_{k/k-1}H_k^T+R_k)^{-1}$;

The formula for completing optimal attitude estimation is:

state estimation equation (5.6): $\hat{X}_{k/k}=\hat{X}_{k/k-1}+K_k(Z_k-H_k\hat{X}_{k/k-1})$, state estimation means square error equation (5.7): $P_{k/k}=(I-K_k H_k)P_{k/k-1}$.

The above-mentioned aspect and any possible implementations further provide an implementation: an Euler analytical method is used for the coarse alignment on a static base, and calculation is carried out directly according to the data of the accelerometer and gyroscope.

The above-mentioned aspect and any possible implementations further provide an implementation: the formula for the coarse alignment includes:

Pitch angle $\hat{\theta}=a \tan 2(\tilde{f}_y, \sqrt{\tilde{f}_x^2+\tilde{f}_z^2})$,
Roll angle $\hat{\gamma}=a \tan 2(-\tilde{f}_x, \tilde{f}_z)$,
Yaw angle $\hat{\psi}=a \tan 2(\tilde{\omega}_x \cos \hat{\gamma}+\tilde{\omega}_z \sin \hat{\gamma}, \tilde{\omega}_x \sin \hat{\theta} \sin \hat{\gamma}+\tilde{\omega}_y \cos \hat{\theta}-\tilde{\omega}_z \cos \hat{\gamma} \sin \hat{\theta})$;

where, $\tilde{f}_x$, $\tilde{f}_y$ and $\tilde{f}_z$ are the measurement data of a three-component acceleration on the body, respectively. $\tilde{\omega}_x$, $\tilde{\omega}_y$ and $\tilde{\omega}_z$ are the measurement data of a three-component gyroscope on the body, respectively. The measurement data of the gyroscope mainly refers to the angular rate.

The above-mentioned aspect and any possible implementations further provide an implementation: the first Kalman alignment and the second Kalman alignment take less than 130 s, and the azimuth alignment accuracy for horizontal well can be achieved within 1 deg.

In another aspect, the present invention provides a measurement while drilling system, including a strapdown inertial navigation system which includes a triaxial gyroscope and a triaxial accelerometer; wherein the strapdown inertial navigation system adopts any one of the attitude measurement methods as described above to suppress a repeatability drift error of the gyroscope and improve accuracy of measurement while drilling in directional drilling.

The above-mentioned aspect and any possible implementations further provide an implementation: the gyroscope is a Coriolis vibratory gyroscope.

The above-mentioned aspect and any possible implementations further provide an implementation: the gyroscope is a high-temperature resonator gyroscope;

the strapdown inertial navigation system also includes a shock absorber which is fixedly connected with the high-temperature resonator gyroscope.

The above-mentioned aspect and any possible implementations further provide an implementation: the high-temperature resonator gyroscope includes a resonator, a circuit board, piezoelectric ceramics, a supporting base, a shell and a binding post, wherein the resonator is arranged in the shell and connected with the supporting base; the piezoelectric ceramics are connected with the binding post through conductive metal wires; the circuit board realizes signal transmission and performs fixed connection at key process points of internal components of the gyroscope; the fixedly connected key process points are located between the piezoelectric ceramics and the resonator, between the binding post and the piezoelectric ceramics, between the binding post and the circuit board, between the supporting base and the resonator, and between the shell and the supporting base.

In another aspect, the present invention provides a continuous navigation measurement system, including a strapdown inertial navigation system which includes a triaxial gyroscope and a triaxial accelerometer; wherein the strapdown inertial navigation system adopts any one of the attitude measurement methods as described above to suppress a repeatability drift error of the gyroscope and improve attitude measurement accuracy in a navigation process.

Attitude measurement information, including a horizontal attitude angle and an azimuth angle, is three parameters: generally, a pitch angle (a well inclination angle) and a roll angle (a tool face angle) are called a horizontal attitude, and a yaw angle (an alignment azimuth) is called an azimuth angle. The purpose of the initial alignment is to perform the related algorithm processing by collecting the data of the accelerometer and gyroscope in real time, so as to acquire the attitude information (the horizontal attitude angle and azimuth angle) of the body.

Compared with the prior art, the present invention can obtain the following technical effects: when the interference angular rate caused by mud sloshing is greater than the earth rotation angular rate, the alignment method can still normally find north, has the better ability of fault tolerance and alignment under slight sloshing, can improve the observability of inertial instrument errors without changing the precision of the inertial instrument itself, and realize the optimal estimation of inertial instrument errors thereby improving the initial alignment accuracy. The two-position alignment algorithm based on Kalman optimal estimation uses strapdown inertial navigation attitude update algorithm and velocity update algorithm to update the angular motion and linear motion of the body in real time, and uses zero-velocity and/or earth rotation angular rate correction algorithm for measurement update and optimal estimation, so that the optimal estimation accuracy is irrelevant to the accuracy of changing the position, and it is not necessary to know the exact position of the position changing mechanism, which is very beneficial in engineering practice, thereby avoiding the design of complex stop structure and avoiding the use of high-temperature-resistant angle measuring mechanism. Changing position for the drift error elimination or drift measurement can only realize drift measurement of horizontal gyroscopes (i.e., X and Y gyroscopes), but cannot realize drift measurement of Z-axis gyroscopes under a large well inclination angle. By providing constraint relationship through zero-velocity correction and constant angular rate correction, the drift measurement of Z-axis gyroscopes can be realized especially.

Obviously, it is not necessary for any product of implementing the present invention to achieve all the above technical effects at the same time.

BRIEF DESCRIPTION OF THE DRAWINGS

In order to explain the technical solution of the embodiments of the present invention more clearly, the drawings used in the embodiments will be briefly introduced below. Obviously, the drawings in the following description are only some embodiments of the present invention, and for those skilled in the art, other drawings can be obtained according to these drawings without paying any creative labor.

DETAILED DESCRIPTION

In order to better understand the technical solution of the present invention, embodiments of the present invention will be described in detail with reference to the accompanying drawings.

It should be clear that the described embodiments are only part of the embodiments of the present invention, not all thereof. Based on the embodiments of the present invention, all other embodiments obtained by those skilled in the art without any creative labor belong to the claimed scope of the present invention.

Terms used in the embodiments of the present invention are for the purpose of describing specific embodiments only, and are not intended to limit the present invention. As used in the embodiments of the present invention and the appended claims, the singular forms "a", "the" and "this" are also intended to include the plural forms unless the context clearly indicates other meaning.

Figure 19:
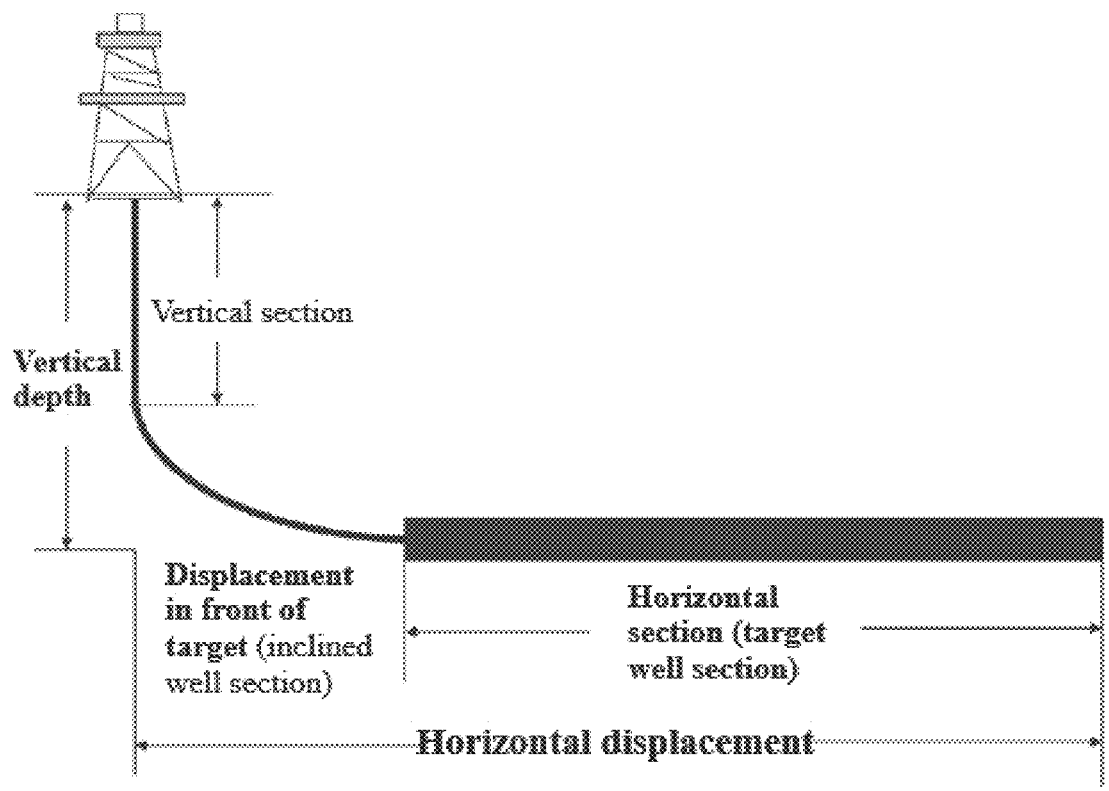
FIG. 19 is a schematic diagram of steerable drilling: a horizontal well according to the present invention.

In view of the shortcomings of the prior art, the attitude measurement method of the present invention adopts the method of Kalman+multi-position (especially two-position)+zero velocity to calibrate a large well inclination angle and correct the constant bias of angular velocity. As shown in FIG. 19, a horizontal well includes: a vertical (well) section, frontal distance from target point (inclined well section) and a horizontal (well) section, in which the well inclination angle of the vertical section is defined as 0°, and displacement in front of target (the inclined well section) means a section where the well inclination angle is greater than 0° and less than 90°, which is usually divided into a small well inclination angle (e.g. 0-20°) and a large well inclination angle (e.g. greater than 70°), which are just commonly known in the field without clear definition. The horizontal section refers to the section where the well inclination angle is 90°. The definition of full well inclination refers to covering from the vertical section to the horizontal section, and the well inclination angle is from 0° to 90°. Two-position is one of the implementation solutions, and any position can be used in practice. From the point of view of a mechanical structure design, two-position alignment is convenient for mechanical structure design, that is, through the design of a mechanical stop, accurate two-point positioning can be realized.

The deduction logic of the measuring method of the present invention is as follow:

1. Basic Principle of Gyro-Steering

Gyro-steering is based on the principle of Gyrocompass, which mainly uses inertial devices (accelerometers and gyroscopes) to measure the angular rate vector of the earth rotation and the acceleration vector of gravity, so as to calculate the included angle between the body and the geographical north direction.

The angular rate $\omega_{ie}$ of the earth rotation is a fixed value of 15.041067°/h (about 0.0042°/s), the longitude and latitude of the location where the measured body is are $\lambda$ and L, respectively, and East-North-Up geographic coordinate system is adopted.

According to the principle of gyro-steering, the horizontal component of the angular rate of the earth rotation is $\omega_N$, of which the magnitude depends on the latitude L of the measuring location.

$$\omega_N = \omega_{ie} \cos L \tag{1.1}$$

For example, the latitude of Beijing is 40°, and the horizontal component of the earth rotation is about 11.52°/h. The higher the latitude, the smaller the horizontal component, and the horizontal component tends to zero near the pole position.

Assuming that the sensing axis of the gyroscope is in the same phase as the moving direction of the body, and defining the azimuth angle $\psi$ as the included angle between the sensing axis of the gyroscope and the north direction, the output value of the gyroscope is obtained as follows:

$$\omega_{ob} = \omega_N \cos \psi + B = \omega_{ie} \cos L \cos \psi + B \tag{1.2}$$

In equation (1.2), $\omega_{ob}$ is an output value of the gyroscope, that is, the observed value, B is the bias of the gyroscope.

Figure 1:
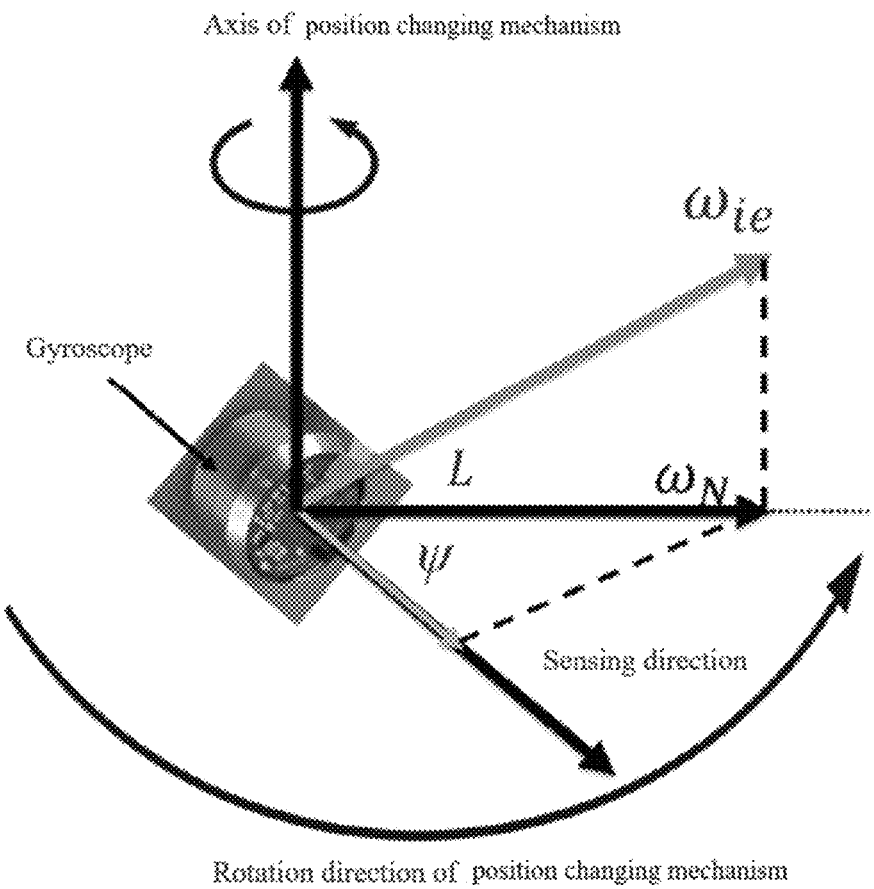
FIG. 1 is a schematic diagram of bias elimination by changing a position of a single-axis gyroscope according to an embodiment of the present invention.

By solving equation (1.2), the azimuth angle $\psi$ of the body can be calculated. In addition, it can be seen from equation (1.2) that the measurement data of the gyroscope contains the bias B of the gyroscope itself, and its value may directly affect the calculation result of the azimuth angle, which is usually eliminated by multi-point position change or continuous rotation modulation. FIG. 1 shows the working principle of a single-axis gyroscope by changing the sensing direction through the rotation of the position changing mechanism. In order to facilitate the mechanical design of the position changing mechanism, a simple position changing method of two positions of 0° and 180° is adopted. The outputs of the gyroscope are respectively as follows:

$$\omega_{ob}(0) = U_1/SF_1 = \omega_{ie} \cos L \cos \psi + B_1 \tag{1.3}$$

$$\omega_{ob}(180) = U_2/SF_2 = -\omega_{ie} \cos L \cos \psi + B_2 \tag{1.4}$$

In equations (1.3) and (1.4), $SF_1$, $SF_2$, $U_1$, $U_2$, $B_1$ and $B_2$ respectively refer to the scale factors, outputs (analog values or digital values) and bias of the gyroscope at 0° and 180° positions.

By setting the north-finding accuracy of the GMD to 1°, and ignoring the scale factor error of the gyroscope, the azimuth measurement of a single-axis gyroscope can be estimated as follows from (1.3) and (1.4):

$$\hat{\psi} = \arccos \frac{\omega_{ab}(0) - \omega_{ab}(180)}{\omega_N \cos \psi} = \arccos \left( \cos \psi + \frac{\varepsilon_B}{\omega_N \cos \psi} \right) \tag{1.5}$$

In equation (1.5), $\varepsilon_B$ is the residual drift error after position changing compensation. Taking Taylor expansion of the above equation and ignoring the high-order term, and the estimation error (precision) at two positions is obtained as follows $$\delta\psi \approx \frac{\varepsilon_B}{\omega_N \sin\psi} \tag{1.6}$$

It can be seen from equation (1.6) that when a single gyro is used for two-position change, the estimation error is the smallest when the two changed positions are selected near the east-west direction ($\psi_1$=90°, 270°), and the estimation error at this time is:

$$\delta\psi = \frac{\varepsilon_B}{\omega_N} = \frac{\varepsilon_B}{\omega_{ie} \cos L} \tag{1.7}$$

Equation (1.7) gives the basic formula of a north-finding estimation accuracy error of the gyroscope. It can be seen that the north-finding accuracy of two-position change is related to a residual drift error of the gyroscope and the local latitude.

2. Steering Principle (Initial Alignment Method)

The steering principle adopts an Euler angle analysis method, which directly calculates the pitch angle (the well inclination angle) $\theta$, roll angle (the tool face angle) $\gamma$ and yaw angle (the azimuth angle) $\psi$ of the body by using information of the gyroscope and accelerometer. Before giving the analytic two-position alignment and two-position Kalman optimal estimation alignment solution parsed by the present invention, the principle and limit accuracy of a coarse alignment are given by using the Euler angle analysis method.

Because the geographical location of the drilling location is known, the component of the angular rate vector of the earth rotation in the geographical coordinate system and the gravity vector can be accurately obtained at this time, as follows:

$$\omega_{ie}^n = \begin{bmatrix} 0 \\ \omega_{ie} \cos L \\ \omega_{ie} \sin L \end{bmatrix} = \begin{bmatrix} 0 \\ \omega_N \\ \omega_U \end{bmatrix}, \tag{2.1}$$

$$g^n = \begin{bmatrix} 0 \\ 0 \\ -g \end{bmatrix}$$

in which, g, $\omega_{ie}$, and L represent the local gravity acceleration, the earth rotation angular velocity, and the local latitude, respectively. The north component of the earth rotation angular velocity is recorded as $\omega_N = \omega_{ie} \cos L$, and the normal component of rotation angular velocity of the earth is recorded as $\omega_U = \omega_{ie} \sin L$.

In the process of a coarse alignment on a static base, the gyroscope and accelerometer in a GMD system respectively measure the projections of the gravity vector and earth rotation angular rate in the body coordinate system. By ignoring the influence of mud sloshing interference, the measurement data of a three-component gyroscope and three-component acceleration on the body are as follows:

$$\tilde{\omega}_{ib}^b = \hat{C}_n^b \omega_{ie}^n \quad (2.2)$$

$$\tilde{f}^b = -\hat{C}_n^b g^n \quad (2.3)$$

where, $$\tilde{\omega}_{ib}^b = [\tilde{w}_x \tilde{w}_x \tilde{w}_x]^T, \tilde{f}^b = [\tilde{f}_x \tilde{f}_y \tilde{f}_z]^T \quad (2.4)$$

The time for coarse alignment is generally very short, and the smoothing average values within a period of time are generally taken as the measurement data values of inertial instruments. When inertial instruments have no obvious drift errors of trend terms, the longer the smoothing time, the better the accuracy can be obtained. Considering the coarse alignment time and alignment accuracy comprehensively, the smoothing time can be judged and analyzed by Allan variance test data, and the optimal time for smoothing is based on the time when Allan variance "bottoms out".

From equation (2.3), the pitch angle can be obtained:

$$\hat{\theta} = a\tan 2(\tilde{f}_y, \sqrt{\tilde{f}_x^2 + \tilde{f}_z^2}) \quad (2.4)$$

The roll angle can be obtained:

$$\hat{\gamma} = a\tan 2(-\tilde{f}_x, \tilde{f}_z) \quad (2.5)$$

On the basis of obtaining $\hat{\theta}$, and $\hat{\gamma}$, they are substituted into equation (2.2) to obtain:

$$\begin{bmatrix} \cos\hat{\gamma} & 0 & \sin\hat{\gamma} \\ \sin\hat{\theta}\sin\hat{\gamma} & \cos\hat{\theta} & -\cos\hat{\gamma}\sin\hat{\theta} \\ -\sin\hat{\gamma}\cos\hat{\theta} & \sin\hat{\theta} & \cos\hat{\gamma}\cos\hat{\theta} \end{bmatrix} \begin{bmatrix} \tilde{\omega}_x \\ \tilde{\omega}_y \\ \tilde{\omega}_z \end{bmatrix} = \begin{bmatrix} -\sin\hat{\psi}\omega_{ie}\cos L \\ \cos\hat{\psi}\omega_{ie}\cos L \\ \omega_{ie}\sin L \end{bmatrix} \quad (2.6)$$

The azimuth angle can be solved as:

$$\hat{\psi} = a\tan\_2(\tilde{\omega}_x \cos\hat{\gamma} + \tilde{\omega}_z \sin\hat{\gamma}, \tilde{\omega}_x \sin\hat{\theta} \sin\hat{\gamma} + \tilde{\omega}_y \cos\hat{\theta} - \tilde{\omega}_z \cos\hat{\gamma} \sin\hat{\theta}) \quad (2.7)$$

Equations (2.4), (2.5), and (2.7) constitute the basic algorithm of the Euler angle coarse alignment. The accuracy limit of the Euler analytical method for static base alignment is analyzed below.

Considering the bias errors of the accelerometer and gyroscope:

$$\nabla^n = C_b^n \nabla^b, \varepsilon^n = C_b^n \varepsilon^b \quad (2.8)$$

In equation (2.8), $\nabla^b$ and $\nabla^n$ respectively represent the bias errors of the accelerometer in a body coordinate system and a navigation system, $\varepsilon^b$ and $\varepsilon^n$ respectively represent the bias errors of the gyroscope in a body coordinate system and a navigation system.

When solving the differential in one direction and making the angles in the other two directions zero, the two sides of equations (2.4), (2.5) and (2.7) are differentiated respectively and the second-order small item is ignored to obtain:

$$\phi_E = -\delta\theta = -\frac{\cos\theta\nabla_y - \sin\theta\nabla_z}{g} = \frac{\nabla_N}{g} \quad (2.9)$$

$$\phi_N = -\delta\gamma = \frac{\cos\gamma\nabla_x + \sin\gamma\nabla_y}{g} = \frac{\nabla_E}{g} \quad (2.10)$$

$$\phi_U = \delta\psi = -\frac{\sin\psi(\varepsilon_y - \delta\theta\omega_U) + \cos\psi(\varepsilon_x + \delta\gamma\omega_U)}{\omega_N} \quad (2.11)$$

$$= \frac{-\varepsilon_E + \phi_N \omega_U}{\omega_N} = -\frac{\varepsilon_E}{\omega_N} + \frac{\nabla_E}{g}\tan L$$

Equations (2.9), (2.10) and (2.11) determine the accuracy limit of static base alignment, that is, the formula of an analytical method for coarse alignment, and the data of the accelerometer and gyroscope can be directly used for calculation. Attitude alignment accuracy under a static base mainly depends on the drift error of the accelerometer in east and north directions, while azimuth alignment accuracy mainly depends on the drift error of the gyroscope in east direction and the drift error of the accelerometer in east direction.

In Kalman optimal estimation, the superscript ^ represents the estimated value, or the calculated value. If there is no superscript, it means that the value is a state value. For example, the estimated value of the well inclination angle $\theta$ is $\hat{\theta}$.

In addition, the measurement data values of accelerometers and gyroscopes selected in equations (2.4), (2.5) and (2.7) can be obtained in many ways. Generally, the average value, sampling time and limit accuracy of sampled values for a period of time are selected, which are usually expressed by an Allan variance method, and the lowest point of the Allan variance is taken as the evaluation of an accuracy limit. Therefore, the longer the integration time, the higher the accuracy after smoothing. However, when there is a trend term error or a drift error, the length of the integration time depends on the time constant of the drift error. When there are abnormal data in the sampling process, or the unexpected disturbance of the drill collar at this time, the measurement error is brought, which is also the biggest risk and problem of coarse alignment.

3. The Method and Principle of Eliminating Constant Bias by Changing the Position Index (i.e., a Two-Position Bias Elimination Method)

The traditional method of eliminating a drift error and improving azimuth alignment accuracy is to use position change index.

Assuming that the constant bias of inertial instrument is constant before and after changing the position, and ignoring the interference of angular motion and linear motion before and after rotation, by rotating the Inertial Measurement Unit (IMU) around one direction, the attitude transition matrix at two positions is constructed, and the observability of the constant bias is increased. In practical applications, limited by the size of inertial instrument and the size characteristics of the slender rod of a GMD probe, the design of position changing mechanism can only be around the axial direction of the probe, i.e., the direction of the input axis around the Z-axis gyroscope.

The positions before and after the position of the gyroscope is changed are $b_1$ and $b_2$, and the average values of sampling outputs of corresponding gyroscopes in alignment time are $\bar{\omega}^{b1}$ and $\bar{\omega}^{b2}$, and the average values of sampling outputs before and after the position of the accelerometer is changed are $\bar{f}^{b1}$ and $\bar{f}^{b2}$, respectively. Assuming that the included angle between positions $b_1$ and $b_2$ is $\beta$, then the state transition matrix formed thereby is $C_{b_1}^{b_2}$.

$$C_{b_1}^{b_2} = \begin{bmatrix} \cos\beta & -\sin\beta & 0 \\ \sin\beta & \cos\beta & 0 \\ 0 & 0 & 1 \end{bmatrix} \quad (3.1)$$

then, there is a relationship between outputs of the inertial instrument at position $b_1$ and $b_2$:

$$\omega^{b_2} = C_{b_1}^{b_2}\omega^{b_1}, f^{b_2} = C_{b_1}^{b_2}f^{b_1} \quad (3.2)$$

Considering that the time of position changing process is very short, ignoring the first-order Markov process in the random constant, and considering that the constant drift of inertial instrument is unchanged before and after changing the position, only the influence of the random drift is considered. In addition, because the gyroscope rotates around Z axis, the sensing direction of a Z-axis gyroscope and accelerometer is unchanged before and after changing the position, so the separation of the Z-axis constant drift cannot be realized. When only the output of a horizontal-axis inertial instrument is considered, $$C_{b_1}^{b_2} = \begin{bmatrix} \cos\beta & -\sin\beta \\ \sin\beta & \cos\beta \end{bmatrix}$$

According to equation (3.2), the output of a horizontal gyroscope at position $b_2$ is:

$$\begin{bmatrix} \overline{\omega}_x^{b_2} \\ \overline{\omega}_y^{b_2} \end{bmatrix} = C_{b_1}^{b_2}\begin{bmatrix} \omega_x^{b_1} \\ \omega_y^{b_1} \end{bmatrix} + \begin{bmatrix} \varepsilon_{0x} \\ \varepsilon_{0y} \end{bmatrix} + \begin{bmatrix} \overline{\varepsilon}_{xw_2} \\ \overline{\varepsilon}_{yw_2} \end{bmatrix} \quad (3.3)$$

Similarly, the output of a horizontal accelerometer at position $b_2$ can be obtained as follows:

$$\begin{bmatrix} \overline{f}_x^{b_2} \\ \overline{f}_y^{b_2} \end{bmatrix} = C_{b_1}^{b_2}\begin{bmatrix} f_x^{b_1} \\ f_y^{b_1} \end{bmatrix} + \begin{bmatrix} \nabla_{0x} \\ \nabla_{0y} \end{bmatrix} + \begin{bmatrix} \overline{\nabla}_{xw_2} \\ \overline{\nabla}_{yw_2} \end{bmatrix} \quad (3.4)$$

Equation (3.3) and equation (3.4) show that in theory, the constant drift of horizontal inertial instrument can be separated at any tiny rotation angle $\beta$, and when the rotation angle $\beta$ is 180°, $\det(I-C_{b1}^{b2})$ is the largest, and the separation of the constant drift error is least affected by the random drift. When the influence of the random drift in the position changing process is not considered, the estimated value of the constant drift of the horizontal gyroscope is:

$$\begin{cases} \hat{\varepsilon}_x = \frac{1}{2}(\overline{\omega}_x^{b_2} + \overline{\omega}_x^{b_1}) \\ \hat{\varepsilon}_y = \frac{1}{2}(\overline{\omega}_y^{b_2} + \overline{\omega}_y^{b_1}) \end{cases} \quad (3.5)$$

The estimated value of the bias of the horizontal accelerometer is:

$$\begin{cases} \hat{\nabla}_x = \frac{1}{2}(\overline{f}_x^{b_2} + \overline{f}_x^{b_1}) \\ \hat{\nabla}_y = \frac{1}{2}(\overline{f}_y^{b_2} + \overline{f}_y^{b_1}) \end{cases} \quad (3.6)$$

The estimated value of the accelerometer after two-position calibration is obtained as follows:

$$\begin{cases} \hat{f}_x^b = \frac{1}{2}(\overline{f}_x^{b_2} - \overline{f}_x^{b_1}) \\ \hat{f}_y^b = \frac{1}{2}(\overline{f}_y^{b_2} - \overline{f}_y^{b_1}) \end{cases}$$

The estimated value of the gyroscope after two-position calibration is:

$$\begin{cases} \hat{\omega}_x^b = \frac{1}{2}(\overline{\omega}_x^{b_2} - \overline{\omega}_x^{b_1}) \\ \hat{\omega}_y^b = \frac{1}{2}(\overline{\omega}_y^{b_2} - \overline{\omega}_y^{b_1}) \end{cases}$$

However, the Z-axis accelerometer and gyroscope are unobservable, so the average value before and after changing the position is directly taken as the estimated value after calibration:

$$\begin{cases} \hat{f}_z^b = \frac{1}{2}(\overline{f}_z^{b_2} + \overline{f}_z^{b_1}) \\ \hat{\omega}_z^b = \frac{1}{2}(\overline{\omega}_z^{b_2} + \overline{\omega}_z^{b_1}) \end{cases}$$

According to the estimated values of the gyroscope and accelerometer after calibration, using the coarse alignment principle similar to the single-position Euler angle analysis, the inclination angle after calibration can be obtained as follows:

$$\hat{\theta} = a\tan 2(\hat{f}_y^b, \sqrt{(\hat{f}_x^b)^2 + (\hat{f}_z^b)^2}) \quad (3.7)$$

The tool face angle after calibration is:

$$\hat{\gamma} = a\tan 2[-\hat{f}_x^b, (\overline{f}_z^{b_2} + \overline{f}_z^{b_1})] \quad (3.8)$$

The azimuth angle after calibration is:

$$\hat{\psi} = a\tan 2(\hat{\omega}_x^b \cos\hat{\gamma} + \hat{\omega}_z^b \sin\hat{\gamma}, \hat{\omega}_x^b \sin\hat{\theta} \sin\hat{\gamma} + \hat{\omega}_y^b \cos\hat{\theta} - \hat{\omega}_z^b \cos\hat{\gamma} \sin\hat{\theta}) \quad (3.9)$$

Equations (3.7)-(3.9) constitute the basic algorithm for analyzing two-position alignment by changing the position by 180° around the Z axis.

Analyzing two positions solves the problem of constant drift error calibration of inertial instrument, and improves the alignment accuracy, especially the azimuth alignment accuracy. For small inclination angle measurement, the main alignment error comes from the error of position changing mechanism and the random drift error of inertial instrument. Because of the design of changing the position by 0-180°, only the final positioning accuracy of changing the position is concerned, which is convenient for the design of position changing mechanism. In practical applications, the positioning accuracy of changing the position can be improved and the design is simplified through the design of a stop structure. With regard to the random drift error, assuming that the alignment time of each position is t, the random walk coefficient of the gyroscope is $N=0.005$ deg/$\sqrt{h}$, then the statistical mean square deviation in time t is obtained as $\sigma=0.005$ deg/$\sqrt{h}$/$\sqrt{t}$. By setting the total alignment time as 300 s, assuming that the alignment time of each position is 145 s, then the random error of the gyroscope caused accordingly is about $\varepsilon_w=0.017$ deg/h. For a quartz flexible accelerometer with a noise of 2 μg/√Hz, the mean square value of random error is 20 μg in the frequency band of 100 Hz. According to the analytical formula (2.11) of the Euler analytical method of azimuth alignment accuracy limit, the azimuth error caused by a random error can be calculated to be about 0.1 deg by setting the latitude of 40° N. In the following simulation, a similar conclusion will be drawn.

For directional drilling measurement applications, under a large well inclination angle and different trajectory directions, the accuracy limit and error mechanism that can be measured by the two-position analytical method are simulated and analyzed. The simulation process is as follows:

The error parameters of the gyroscope and accelerometer are set as the simulation parameters of high-temperature inertial instrument in Table 1. The initial position is set to [116° E, 40° N, 100 m], and the instrument is in the first alignment position in the first 145s, rotates by 180° to the second position along the Z-axis direction of the probe during 146-155 s, and then continues to align for 145 s, with the total alignment time of 300 s. The well inclination angle is in the range of 0-90°, one position is taken every 1°, there are 91 positions in total, and 40 Monte-Carlo simulations are carried out for each position, and the root mean square value is taken.

TABLE 1

Simulation parameter setting table of high-temperature inertial instrument

| Error source | Error form | Indicators |
|---|---|---|
| Gyroscope repeatability drift | Mean square deviation of random constant | [2; 2; 2]°/h |
| Gyro random noise | Angle random walk | [0.005; 0.005; 0.005]°/√h |
| Accelerometer bias repeatability | Mean square deviation of random constant | 200 μg |
| Accelerometer random noise | Mean square deviation of noise | 2 μg/√Hz@DC-100 Hz |

Figure 2:
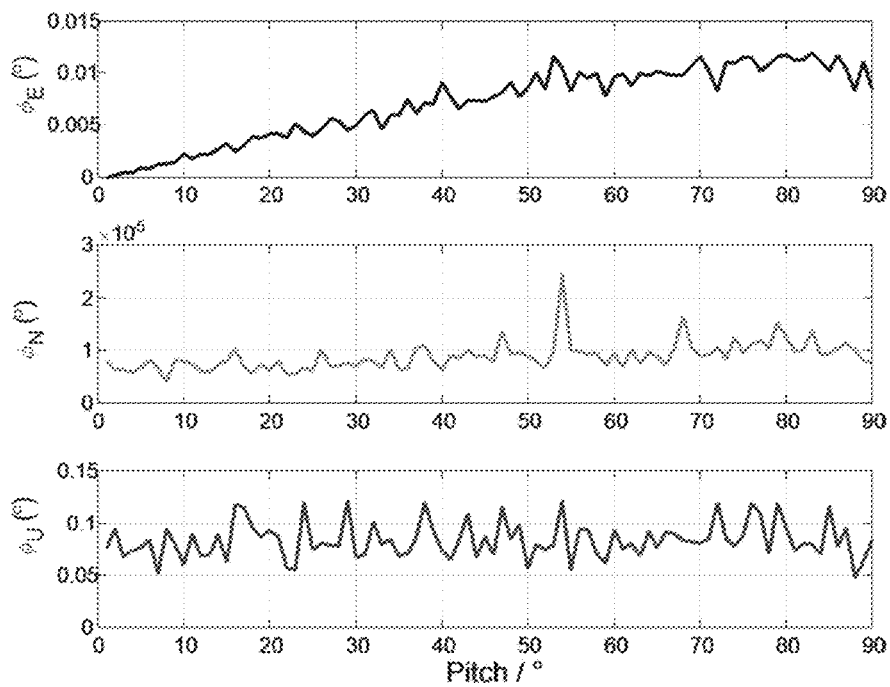
FIG. 2 is a curve graph of misalignment angles of the alignment of a south-north well trajectory during the two-position alignment (i.e., position changing alignment) according to an embodiment of the present invention.
Figure 3A:
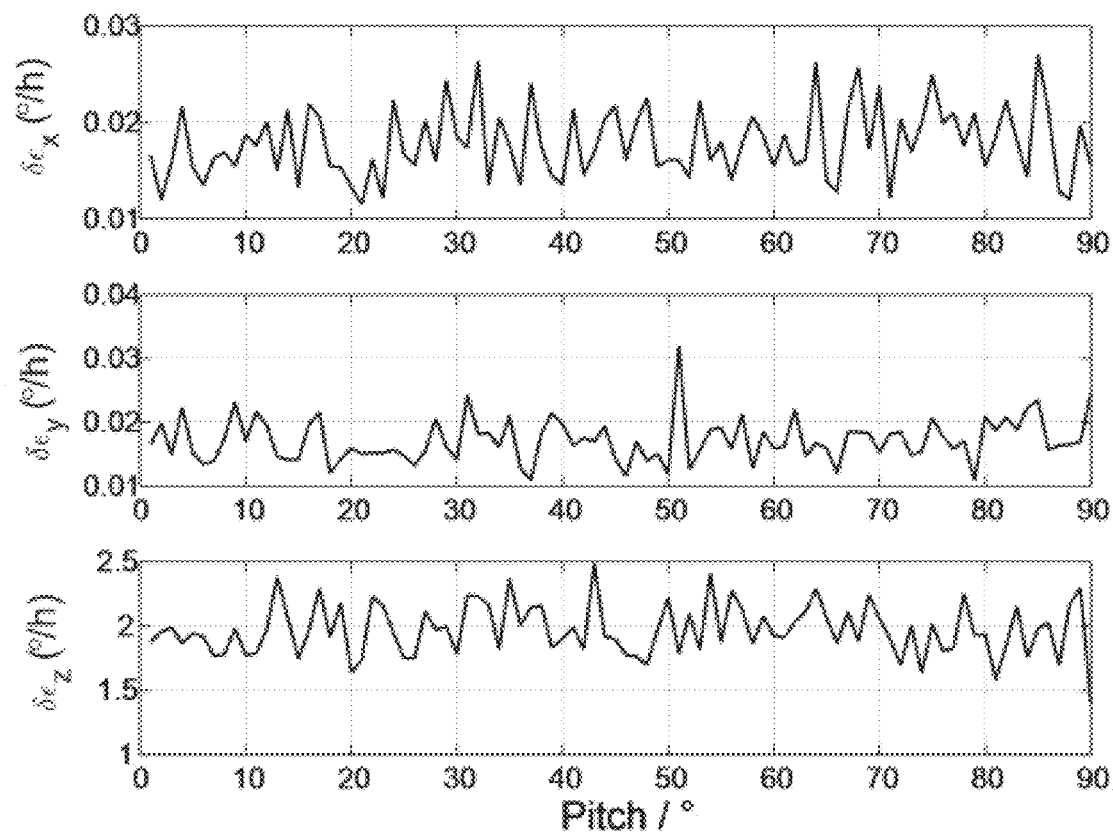
FIG. 3A is a curve graph of gyroscope constant drift estimation errors of the south-north well trajectory during bias correction by a position changing method according to an embodiment of the present invention.
Figure 3B:
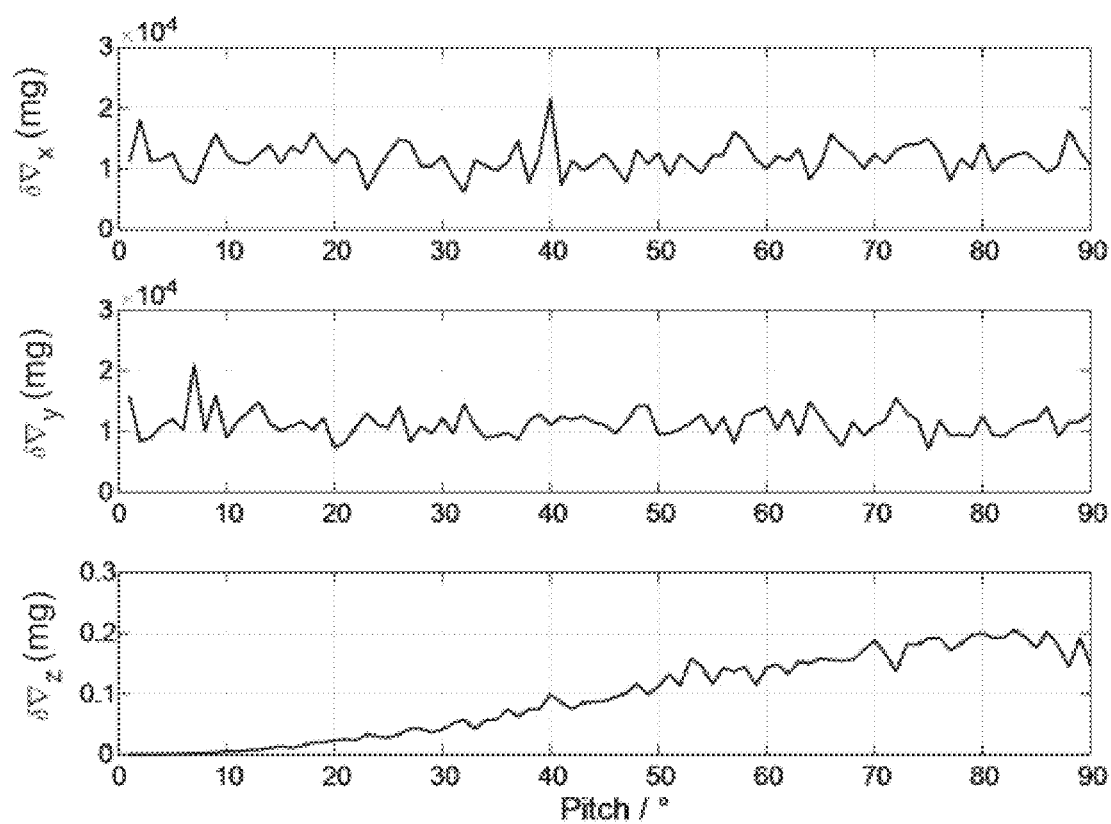
FIG. 3B is a curve graph of accelerometer constant drift estimation errors of the south-north well trajectory during bias correction by a position changing method according to an embodiment of the present invention.

Simulation 1: The well trajectory is south-north direction, and the vertical well attitude azimuth is [0°, 0°, 0°] and the horizontal well attitude azimuth is [90°, 0°, 0°] in the geographic coordinate system. FIG. 2 is a curve of alignment misalignment angle errors, and FIG. 3(a) and FIG. 3(b) are the constant drift estimation errors of the gyroscope and accelerometer in turn.

It can be seen from FIG. 2 that the azimuth alignment accuracy is not affected by the well inclination angle when the well trajectory to be measured is in the south-north direction, that is, the azimuth measurement error is always around 0.1° from the vertical well section to the horizontal well section, which is also in line with the conclusion of formula (2.11). It is not difficult to understand from the initial alignment mechanism that the azimuth misalignment angle is related to the accuracy of the equivalent east gyroscope, and since the east gyroscope can always be changed the position and modulated from the vertical well section to the horizontal well section in the south-north direction, that is, the constant drift of the east and west gyroscopes can always be observed, that is, the constant drift of the equivalent east gyroscope can be eliminated under any well inclination angle by means of changing the position. The final azimuth alignment accuracy mainly depends on the random drift of the east gyroscope. The simulation results in FIG. 2 can verify this conclusion. In addition, it can be seen from the east misalignment angle in FIG. 2 and the estimation error curve of a Z-axis accelerometer in FIG. 3(b) that the observability of the Z-axis accelerometer becomes worse with the increase of the inclination angle, and when the Z-axis inclines in the south-north direction, the error of the east misalignment angle increases with the increase of the inclination angle, but its error is far less than the target accuracy index, and the influence can be ignored.

Simulation 2: The well trajectory runs the east-west direction. In the geographic coordinate system, the vertical well attitude azimuth coordinates are [0°, 0°, 90°], and the horizontal well attitude azimuth coordinates are [90°, 0°, 90°]. The simulation results are shown in FIG. 4.

Figure 4:
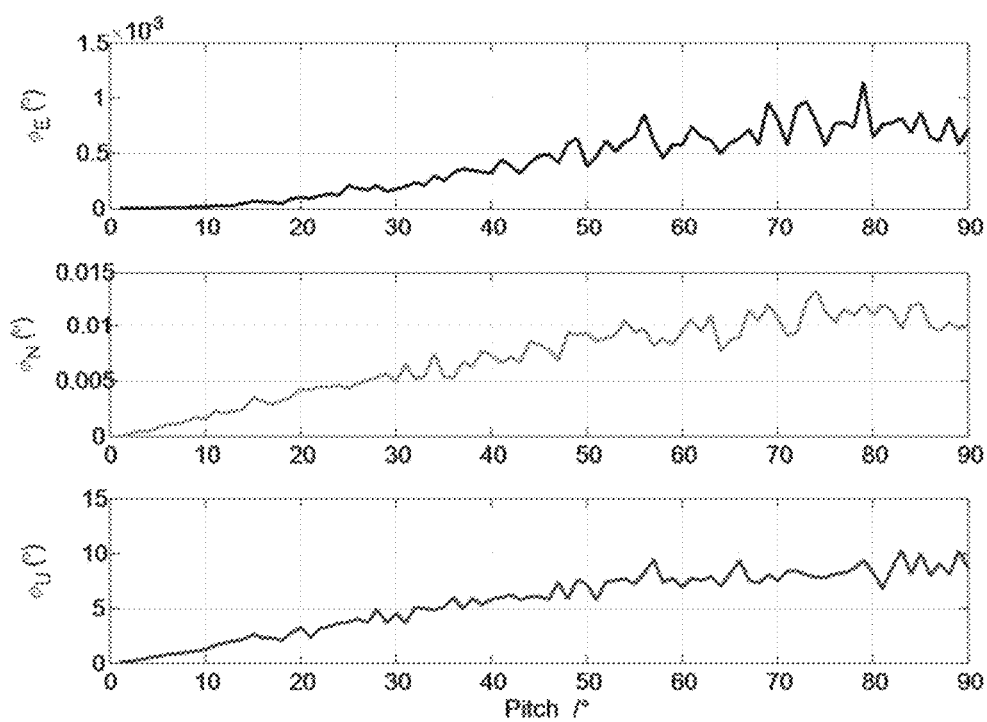
FIG. 4 is a curve graph of misalignment angles of horizontal attitude and azimuth alignment when the well trajectory runs east-west direction during bias correction by a position changing method according to an embodiment of the present invention.
Figure 5A:
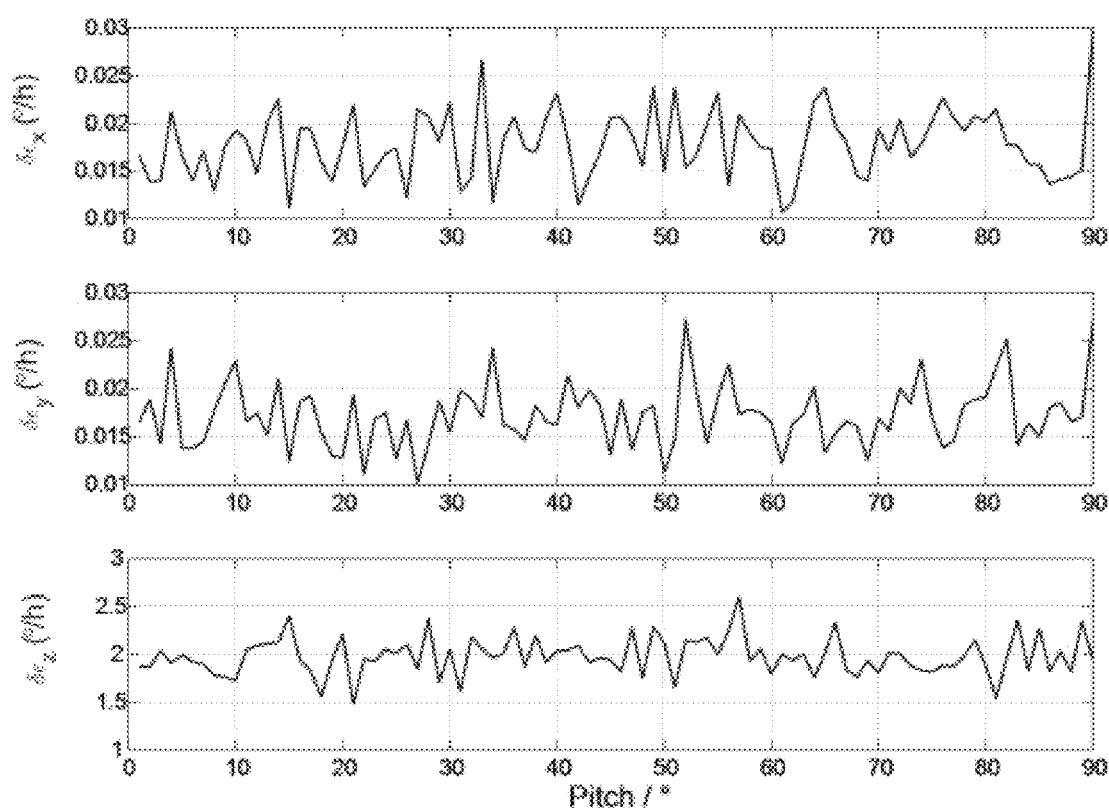
FIG. 5A is a curve graph of gyroscope constant drift estimation errors of an east-west well trajectory during bias correction by a position changing method according to an embodiment of the present invention.
Figure 5B:
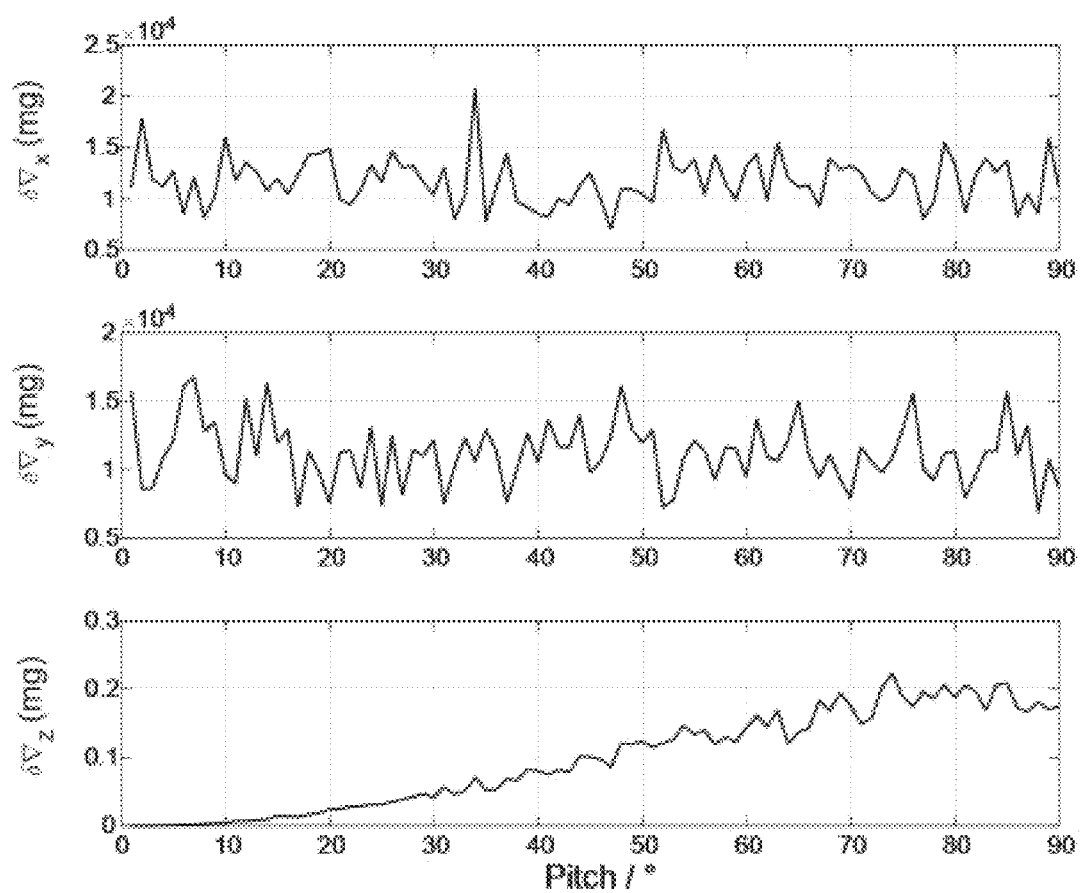
FIG. 5B is a curve graph of accelerometer constant drift estimation errors of an east-west well trajectory during bias correction by a position changing method according to an embodiment of the present invention.

It can be seen from FIG. 4 that when the well trajectory is in the east direction, the estimation error of the azimuth misalignment angle increases obviously with the increase of the well inclination angle. The main reason is that when the well inclination angle increases, the Z-axis gyroscope becomes the main contributor to the error of the east gyroscope, while the position change rotates around the Z-axis, and the constant drift of the Z-axis itself is unobservable, thus directly causing the error of the azimuth misalignment angle. It can also be seen from FIG. 4 that in order to ensure that the azimuth measurement accuracy is better than 1°, the well inclination angle cannot exceed 10°.

Figure 6:
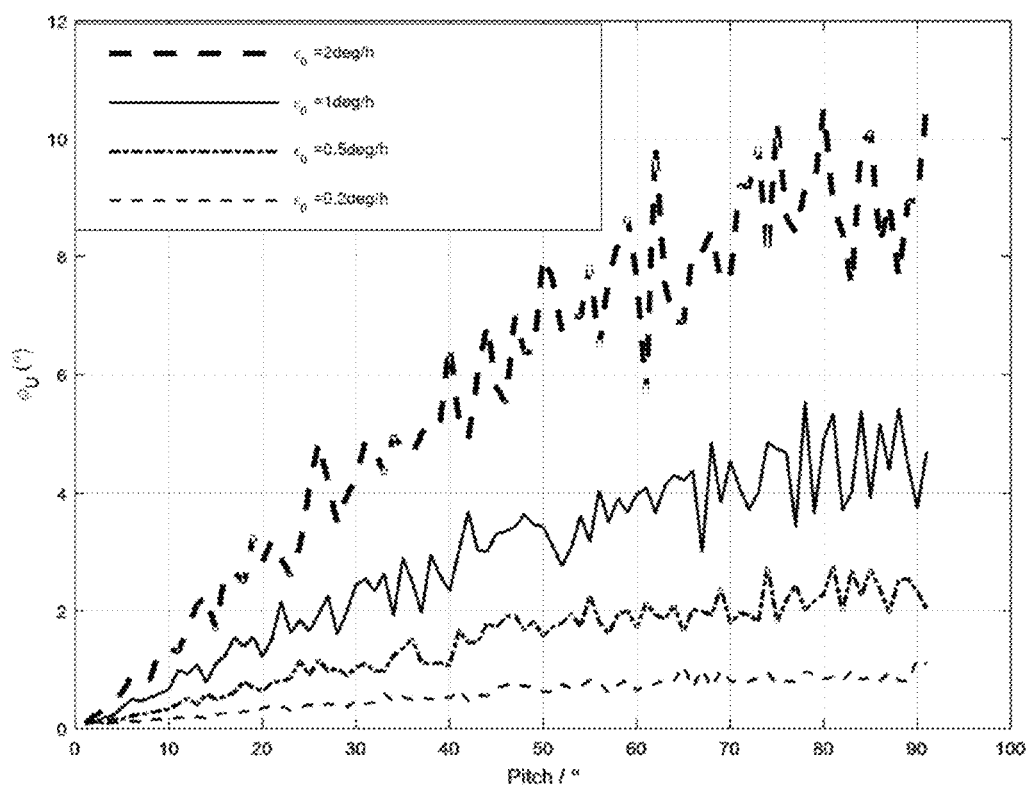
FIG. 6 is a curve graph of full-well inclination azimuth alignment accuracies obtained under different constant drift errors by a two-position bias correction method according to an embodiment of the present invention.

For two-position analytical alignment, the azimuth measurement accuracy under a large inclination angle can be improved by reducing the constant drift of the gyroscope. FIG. 6 gives the simulation curves of azimuth measurement accuracy under different inclination angles of the gyroscope with different constant drifts. It can be seen that the accuracy requirement of well trajectory measurement is 1°, in order to ensure the accuracy under a large well inclination angle, it is required that the constant drift of the gyroscope to be less than 0.2 deg/h. For the working conditions under high-temperature and strong-vibration environment, the bias repeatability error is the main bottleneck restricting the accuracy of the gyroscope. It is very challenging to develop a gyroscope that meets the constant drift error of 0.2 deg/h under working conditions.

For analytical two-position alignment, on the premise of fixed precision of inertial devices, the azimuth accuracy of a small well inclination angle under east-west trajectory and the full well inclination angle (0-90°) under south-north trajectory can be effectively improved by means of position changing calibration, but the azimuth accuracy of a large well inclination angle under east-west trajectory still cannot meet the use requirements, so a more effective method is needed to improve the azimuth measurement accuracy of a large well inclination angle under the condition of limited precision of inertial devices.

4. Alignment Method of Two-Position+Kalman

According to the present invention, a multi-position and Kalman alignment method is adopted to solve the drift measurement problem of the east gyroscope under a large well inclination angle.

The method includes the following steps:

the navigation coordinate system is East-North-Up geographic coordinate system, a 12×1-dimension inertial navigation system precise alignment mathematical model is established, and the state variables of the Kalman filter are as follows:

$$X = [(\delta v_n)^T (\phi_n)^T (\varepsilon_0^b)^T (\nabla_0^b)^T]^T \quad (4.1)$$

In equation (4.1): $\delta v^n$ is a velocity error, $\emptyset n$ is a mathematical platform misalignment angle of strapdown inertial navigation, $\vartheta_0^b$ is a constant drift of a high-temperature gyro, $\nabla_0^b$ is a constant bias of a high-temperature accelerometer; $\varepsilon_0^b$ and $\nabla_0^b$ are mainly caused by the repeatability error of successive start-up of the high temperature inertial instruments. According to the error model of the strapdown inertial navigation system under a static base and by ignoring a small amount of error, the state equation can be obtained as follows:

$$\dot{X} = FX + W \quad (4.2)$$

In the above equation, $$F = \begin{bmatrix} 0_{3\times3} & f^n \times & 0_{3\times3} & C_b^n \\ 0_{3\times3} & -\omega_{ie}^n \times & -C_b^n & 0_{3\times3} \\ 0_{3\times3} & 0_{3\times3} & 0_{3\times3} & 0_{3\times3} \\ 0_{3\times3} & 0_{3\times3} & 0_{3\times3} & 0_{3\times3} \end{bmatrix}, W = \begin{bmatrix} C_b^n \nabla_w^b \\ -C_b^n \varepsilon_w^b \\ 0_{3\times1} \\ 0_{3\times1} \end{bmatrix} \quad (4.3)$$

In equation (4.3), $\varepsilon_w^b$ and $\nabla_w^b$ are random white noises in the body coordinate system (b system) of the accelerometer and gyroscope respectively. Through test and verification, after comprehensive temperature compensation and elimination of the Warm-up factor, the output of inertial instrument can be characterized as zero mean normal distribution. In practical applications, an Allan variance is usually used to solve each model coefficient as the prior value of inertial instrument model estimation.

$$f^n \times = \begin{bmatrix} 0 & -g & 0 \\ g & 0 & 0 \\ 0 & 0 & 0 \end{bmatrix},$$

g is the acceleration of gravity, $f^n = [0 \ 0 \ g]$, x is defined as an anti-symmetric matrix formula, a vector is defined as H=[a b c], and its anti-symmetric matrix is defined as $$(H \times) = \begin{bmatrix} 0 & -c & b \\ c & 0 & -a \\ -b & a & 0 \end{bmatrix}.$$

When the GMD system is aligned under the static base, the body is stationary, and the output velocity $v^n$ of the navigation solution is the velocity error $\delta v^n$. $\delta v^n$ is used as the measurement data, and the measurement equation is:

$$Z_v = \delta v^n = H_v X + V_v \quad (4.4)$$

in which $V_v$ is the velocity measurement noise in the navigation coordinate system, $\delta v^n$ is the velocity error, I represents the unit matrix, and X represents the Kalman filter state variable; $Z_v$ is a velocity observed value, $H_v = [I_{3\times3} \ 0_{3\times3} \ 0_{3\times3} \ 0_{3\times3}]$.

The theoretical analysis of observability of single-position Kalman alignment is relatively mature. When Kalman optimal estimation alignment method is adopted under a static base, the observability of $\varnothing_U$, $\varepsilon_N$ and $\varepsilon_U$ is weak, while $\nabla_E$, $\nabla_N$ and $\varepsilon_E$ are completely unobservable. Single-position Kalman alignment under a static base cannot estimate the constant drift of the accelerometers in the east and north directions or error of the gyroscopes in the east direction. However, the error of the east accelerometer determines the misalignment angle in the north direction, the error of the north accelerometer determines the misalignment angle in the east direction, and the azimuth misalignment angle mainly depends on the error of the equivalent east gyroscope. Therefore, under the condition of a static base, the initial alignment method of single-position Kalman optimal estimation is adopted. Because the observability of the core inertial instrument is weak, the accuracy of initial alignment is limited by the constant drift of the inertial instrument, while the convergence time of horizontal attitude alignment and the convergence time of azimuth alignment respectively depend on the random drift of the horizontal accelerometer and the angle random walk coefficient of the east gyroscope.

For directional drilling measurement applications, the accuracy of the current high-temperature quartz flexible accelerometer can basically meet the requirements of attitude alignment accuracy under a static base, and the accuracy of the gyroscope, especially the repeatability error of successive startup, has become the core factor restricting the azimuth alignment accuracy. There are many ways to improve the accuracy of azimuth measurement. On the one hand, one way is to improve the accuracy of inertial instrument itself, and fundamentally solve the factors affecting repeatability errors, such as precision machining of sensing units of inertial instrument, static balance and dynamic balance, optimization of material characteristics, optimization of the control circuit, etc., but there are problems such as a long research and development cycle and a high cost. On the other hand, from the point of view of calibration, using the characteristics of current inertial instruments, the purpose of improving the precision of inertial system is achieved through external calibration or internal calibration, while external calibration usually adopts the method of multi-position index+Kalman algorithm.

In essence, the two-position alignment method belongs to Euler angle initial alignment under a static base, and the optimal estimation of inertial instrument error cannot be realized by analyzing the two-position alignment, especially under the east-west well trajectory. It can be seen from FIG. 4 that the azimuth alignment accuracy deteriorates sharply when the inclination angle is greater than 10°. In addition, because the analytical method only picks up the output information of inertial instruments on the body for a period of time as observations, its alignment accuracy is limited by the ideal degree that the body is still without sloshing in the sampling period. Because the GMD works in the state of stopping drilling and finding north, the mud motor may still work, and when the interference angular rate caused by mud sloshing is greater than the earth rotation angular rate, the analytical two-position alignment cannot work normally. Kalman multi-position alignment based on optimal estimation has the ability of fault tolerance of information and alignment under slight sloshing. Without changing the precision of inertial instrument itself, it is possible to improve the observability of the errors of the inertial instrument and realize the optimal estimation of inertial instrument errors, thus improving the initial alignment accuracy. Limited by the narrow size of the probe, two-position change around the axial direction of the probe is the preferred solution of the present invention.

Similar to the state equation established for initial alignment of Kalman optimal estimation under a static base, the state equation of two-position Kalman optimal estimation is as shown in equation (4.2). Assuming that the position changing time is short, it is considered that the constant drift errors $\varepsilon_0^b$ and $\nabla_0^b$ are fixed before and after changing the position, which is similar to the alignment of two-position analytical method. The attitude matrix $C_b^n$ of an inertial navigation system is changed by external rotation, thus increasing the observability of system state variables, especially the constant drift of the inertial instrument. The two-position method realizes precise alignment and estimates the error of the inertial instrument at the same time. Similarly, when the rotation angle is 180°, the change of attitude matrix $C_b^n$ is the largest, and the observability of the estimated state is the strongest. Equations (4.5) and (4.6) are solved.

The equation of the attitude error of the GMD under a static base is shown in equation (4.5):

$$(\dot{\phi}^n)^T = -\omega_{ie}^n \times (\phi^n)^T - C_b^n(\varepsilon_0^b)^T - C_b^n(\varepsilon_w^b)^T \quad (4.5)$$

$$= \begin{bmatrix} 0 & \omega_{ie}\sin L & -\omega_{ie}\cos L \\ -\omega_{ie}\sin L & 0 & 0 \\ \omega_{ie}\cos L & 0 & 0 \end{bmatrix} \begin{bmatrix} \phi_E \\ \phi_N \\ \phi_U \end{bmatrix} -$$

$$C_b^n \begin{bmatrix} \varepsilon_{0x}^b \\ \varepsilon_{0y}^b \\ \varepsilon_{0z}^b \end{bmatrix} - C_b^n \begin{bmatrix} \varepsilon_{wx}^b \\ \varepsilon_{wy}^b \\ \varepsilon_{wz}^b \end{bmatrix}$$

The equation for the velocity error of a GMD under a static base is shown in equation (4.6):

$$(\delta\dot{v}^n)^T = f^n \times (\phi^n)^T + C_b^n(\nabla_0^b)^T + C_b^n(\nabla_w^b)^T \quad (4.6)$$

$$= \begin{bmatrix} 0 & -g & 0 \\ g & 0 & 0 \\ 0 & 0 & 0 \end{bmatrix} \begin{bmatrix} \phi_E \\ \phi_N \\ \phi_U \end{bmatrix} + C_b^n \begin{bmatrix} \nabla_{0x}^b \\ \nabla_{0y}^b \\ \nabla_{0z}^b \end{bmatrix} + C_b^n \begin{bmatrix} \nabla_{wx}^b \\ \nabla_{wy}^b \\ \nabla_{wz}^b \end{bmatrix}.$$

The best observation of $\nabla_{0x}^b$ and $\nabla_{0y}^b$, $\varepsilon_{0x}^b$ and $\varepsilon_{0y}^b$ can be realized by changing the position by 180°. The former can improve the estimation accuracy of $\varnothing_E$ and $\varnothing_N$, while the latter can improve the estimation accuracy of $\varnothing_U$. However, the observability of $\nabla_Z$ itself is high under a small inclination angle. Therefore, for the solution of axially changing the position around a GMD probe, as the traditional Kalman optimal estimation method of static base alignment, when only a velocity error $\delta v^n$ is used for the observation equation, the observability of the Z-axis gyro drift $\varepsilon_z$ is the worst, which limits the azimuth measurement accuracy when the GMD works at a large inclination angle.

Figure 18:
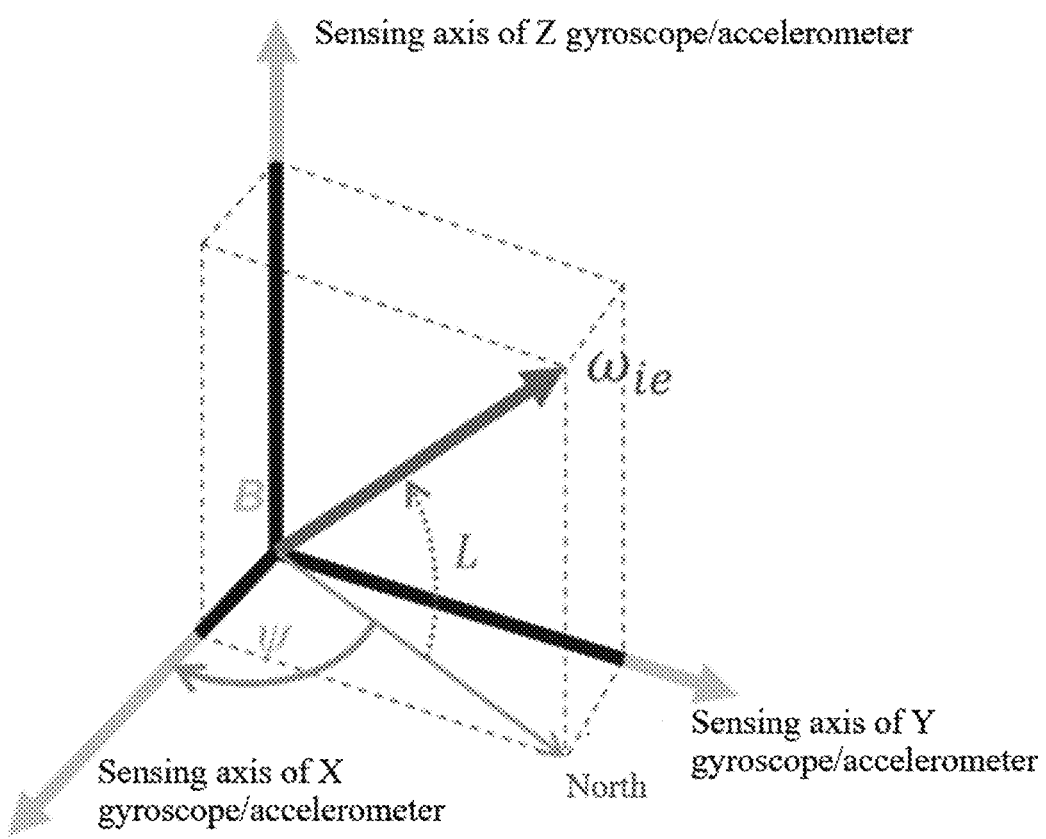
FIG. 18 is a schematic diagram of attitude measurement of a standard strapdown inertial navigation system.

According to the azimuth measurement principle of the standard strapdown inertial navigation system in FIG. 18, when the position of the Z-axis is changed, according to the equations (3.5)-(3.9), the X-axis gyroscope and the Y-axis gyroscope can separate the repeatability error by the way of changing the position. However, when the well inclination angle is large, especially in the east-west direction, the Z-axis gyroscope becomes an/a east (west) gyroscope, and due to the size of the GMD, the position changing mechanism can only rotate around the Z-axis. Therefore, the Z-axis gyroscope will not be able to separate the error coefficient by means of changing the position at a large well inclination angle. At this time, if there is only zero-velocity correction, it is impossible to estimate the repeatability drift error of the Z-axis gyroscope. According to equations (2.9), (2.10) and (2.11), the azimuth alignment accuracy mainly depends on the drift error of the east gyroscope, while the drift error of the Z-axis gyroscope cannot be estimated at this time, therefore, the azimuth accuracy cannot meet the requirements.

In order to estimate the constant drift error of the Z-axis gyroscope under a large well inclination angle, it is necessary to increase the observations. In this text, the earth rotation angular rate under a static base is used as a new observation. After obtaining the optimal estimation of the horizontal attitude, the difference between the projection of a body coordinate system under a navigation system and the earth angular rate under the navigation system is used as Kalman observation information. Simulation shows that the drift error of the Z-axis gyroscope is well estimated.

The measurement equation is as follows:

$$Z_\omega = \delta\omega^n = C_b^n\omega^b - \omega_{ie}^n = (I - \phi^n \times)C_b^n(\omega^b + \varepsilon^b) \approx (C_b^n\omega^b \times)$$
$$\phi^n + C_b^n\varepsilon^b = \omega_{ie}^n \times \phi^n + C_b^n\varepsilon^b \quad (4.7)$$

The measurement equation obtained from this is:

$$Z_\omega = [0_{3\times3} \; \omega_{ie}^n \times C_b^n \; 0_{3\times3}]X + V_\omega \quad (4.8)$$

In equation (4.8), $V_\omega$ refers to the angular rate measurement noise, $Z_\omega$ represents an angular rate observation.

So far, a complete Kalman optimal estimation state equation (4.2) has been established, and the measurement equations are as follows in equations (4.4) and (4.8).

Explanation of Relevant Meanings of this Part:

For an error model of inertial instrument, under a static base, by ignoring the scale factor error and installation error, an output model of a gyroscope in a body coordinate system can be expressed as:

$$\tilde{\omega}^b = \omega^b + \varepsilon_0 + \varepsilon_r + \varepsilon_w \quad (4.9)$$

where, $\tilde{\omega}^b$ is the average value of a sampling output of the gyroscope, $\omega^b$ is the true angular rate input value of the gyroscope, $\varepsilon_0$ is the constant drift of the gyroscope, $\varepsilon_r$ is a slow drift, and $\omega_w$ is a fast drift.

According to the Allan variance concept, $\varepsilon_0$ is mainly the repeatability error of successive start-p, which can be expressed by a random constant, and its error model is:

$$\dot{\varepsilon}_0 = 0 \quad (4.10)$$

The slow drift $\varepsilon_r$ represents the trend term of the gyroscope and represents the rate ramp term in the Allan variance, which can usually be described by a first-order Markov process, namely:

$$\dot{\varepsilon}_r = -\frac{1}{\tau_g}\varepsilon_r + w_r \quad (4.11)$$

In equation (4.11), $\tau_g$ is the relevant time of the Markov process, and $w_r$ is a white noise.

According to the Allan variance of a high-temperature gyroscope prototype, through comprehensive error compensation, the trend term error related with time of the gyroscope can be suppressed, and the Allan variance of the gyroscope can be kept for a long time after "bottoms out" time. Therefore, in fact, the Markov relevant time is long and can be ignored in alignment time, and the output model of the gyroscope can be simplified as:

$$\tilde{\omega}^b = \omega^b + \varepsilon_0 + \varepsilon_w \quad (4.12)$$

where, the bias error of the gyroscope is:

$$\varepsilon = \varepsilon_0 + \varepsilon_w \quad (4.13)$$

Usually, the term $\varepsilon_w$ related to the white noise is expressed by an angle random walk coefficient ARW.

Similarly, the output model of the accelerometer can be simplified as:

$$\tilde{f}^b = f^b + \nabla_0 + \nabla_w \quad (4.14)$$

where, $\tilde{f}^b$ is the mean value of a sampling output of the accelerometer, $f^b$ is the actual acceleration value of the accelerometer, $\nabla_0$ is the constant drift of the accelerometer and $\nabla_w$ is a random error of the white noise.

$\nabla_0$ is mainly the repeatability error of successive startup of the accelerometer, which can also be expressed by a random constant, and its error model is:

$$\dot{\nabla}_0 = 0 \qquad (4.15)$$

The bias error of the accelerometer is defined as:

$$\nabla = \nabla_0 + \nabla_w \qquad (4.16)$$

5. Flow Design of a Two-Position+Kalman Algorithm

The state equation (4.2) and measurement equations (4.4) and (4.8) are discretized, and the state space model of a stochastic system aligned under a GMD static base is obtained:

$$\begin{cases} X_k = \Phi_{k/k-1} X_{k-1} + \Gamma_{k-1} W_{k-1} \\ Z_k = H_k X_k + V_k \end{cases} \qquad (5.1)$$

In equation (5.1), $X_k$ is the 12×1-dimension state vector shown in equation (4.1) (in equation (4.1): $\delta v^n$ is a velocity error, $\phi^n$ is a mathematical platform misalignment angle of strapdown inertial navigation, $\varepsilon_0^b$ is a high-temperature gyroscope constant drift and $\nabla_0^b$ is a high-temperature accelerometer constant bias, each of which contains triaxial components, totaling 12), $Z_k$ is a measurement vector composed of a velocity measurement $Z_v$ and an angular rate measurement $Z_\omega$, $\Phi_{k/k-1}$ is the discretization of 12×1-dimension one-step state transition matrix F, and Kalman is recursive. Therefore, k−1 is the last time, k is the one-step recursive time for k−1; $F_{k/k-1}$ is a system noise distribution matrix, $H_k$ is a measurement matrix, $W_{k-1}$ is a system noise vector, $V_k$ is the measurement noise vector, including velocity measurement noise and angular rate measurement noise, and $W_{k-1}$ and $V_k$ are uncorrelated zero-mean Gaussian white noise vector sequences, then:

$$E\{W_k W_j^T\} = Q_k \delta_{kj};$$

$$E\{V_k V_j^T\} = R_k \delta_{kj};$$

$$E\{W_k V_j^T\} = 0 \qquad (5.2)$$

$Q_k$ and $R_k$ are respectively called as variance matrices of a system noise and a measurement noise, which are required to be known non-negative definite matrix and positive definite matrix respectively in Kalman filter, and $\delta_{kj}$ is Kronecker δ function; when k≠j, $\delta_{kj}$=0, and when k=j, $\delta_{kj}$=1.

The discrete Kalman filter equation of GMD fine alignment can be divided into five basic formulas, as follows:

① one-step state prediction equation $$\hat{X}_{k/k-1} = \Phi_{k/k-1} \hat{X}_{k-1/k-1} \qquad (5.3)$$

② one-step prediction mean square error equation $$P_{k/k-1} = \Phi_{k/k-1} P_{k-1/k-1} \Phi_{k/k-1}^T + \Gamma_{k/k-1} Q_{k-1} \Gamma_{k/k-1}^T \qquad (5.4)$$

③ filter gain equation $$K_k = P_{k/k-1} H_k^T (H_k P_{k/k-1} H_k^T + R_k)^{-1} \qquad (5.5)$$

④ state estimation equation $$\hat{X}_{k/k} = \hat{X}_{k/k-1} + K_k (Z_k - H_k \hat{X}_{k/k-1}) \qquad (5.6)$$

⑤ state estimation mean square error equation $$P_{k/k} = (I - K_k H_k) P_{k/k-1} \qquad (5.7)$$

Figure 7:
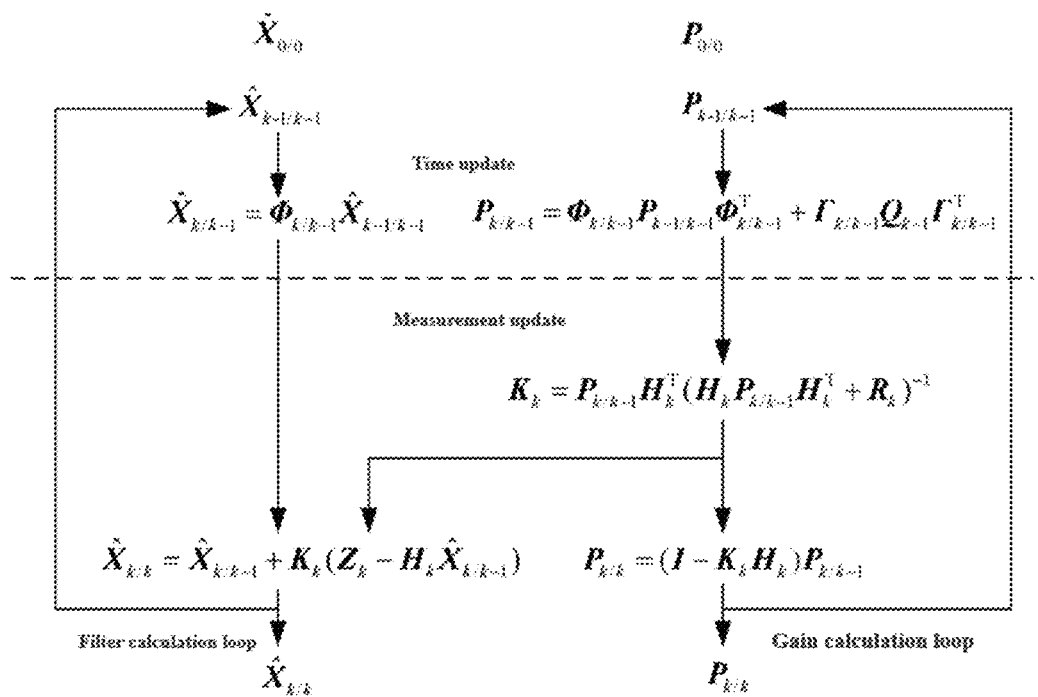
FIG. 7 is a flow chart of a two-position Kalman filter algorithm according to an embodiment of the present invention.

FIG. 7 is the flow chart of the Kalman filter algorithm. It can be seen from the figure that the algorithm flow of the Kalman filter can be divided into two calculation loops and two update processes. The left side is a filter calculation loop to complete the iterative calculation of the estimated state variable, and the right side is a gain calculation loop to complete the calculation of Kalman gain. The upper and lower parts of the dotted line constitute two update processes. During the time update, the state one-step prediction $\hat{X}_{k/k-1}$ and mean square error one-step prediction $P_{k/k-1}$ are completed. After the time update is completed, if there is no measurement data at this time, the one-step prediction value is used as the optimal estimation output of the state. In the position changing process of GMD, neither the velocity measurement with zero-speed correction nor the angular rate measurement constrained by the earth rotation angular rate is available, so there is no measurement data in this process. The optimal estimation value is the one-step prediction value, i.e.: $\hat{X}_k = \hat{X}_{k/k-1}$ and $P_k = P_{k/k-1}$. If the measurement data value is valid, that is, the GMD is in a static state before and after changing the position, and it is judged that the disturbance amount of the external mud is less than the set value, then the measurement update is started, the gain coefficient $K_k$ is calculated to obtain the optimal state estimation $\hat{X}_{k/k}$, and the covariance matrix $P_{k/k}$ at this time is calculated. So far, a cycle of optimal state estimation has been completed.

A two-position alignment algorithm based on Kalman optimal estimation uses attitude update algorithm and velocity update algorithm of a strapdown inertial navigation to update angular motion and linear motion of the body in real time, and uses the zero-velocity and earth rotation angular rate correction algorithms for measurement update and optimal estimation. Therefore, the optimal estimation accuracy is irrelevant to the accuracy of changing the position, and there is no need to know the exact position of the position changing mechanism, which is very beneficial in engineering practice, thereby avoiding the design of a complex stop structure and further avoiding the use of high-temperature resistant angle measuring mechanism. This is the characteristic and advantage of the Kalman algorithm+ two position alignment method of the present invention.

In the process of measurement update, it is necessary to solve the inverse operation of a high-dimensional matrix, so as to obtain the gain coefficient of Kalman filter. In order to reduce the computation, Sequential Kalman Filter is often used to solve the measurement matrix composed of velocity measurement Z and earth rotation angular rate measurement $Z_\omega$.

Figure 8:
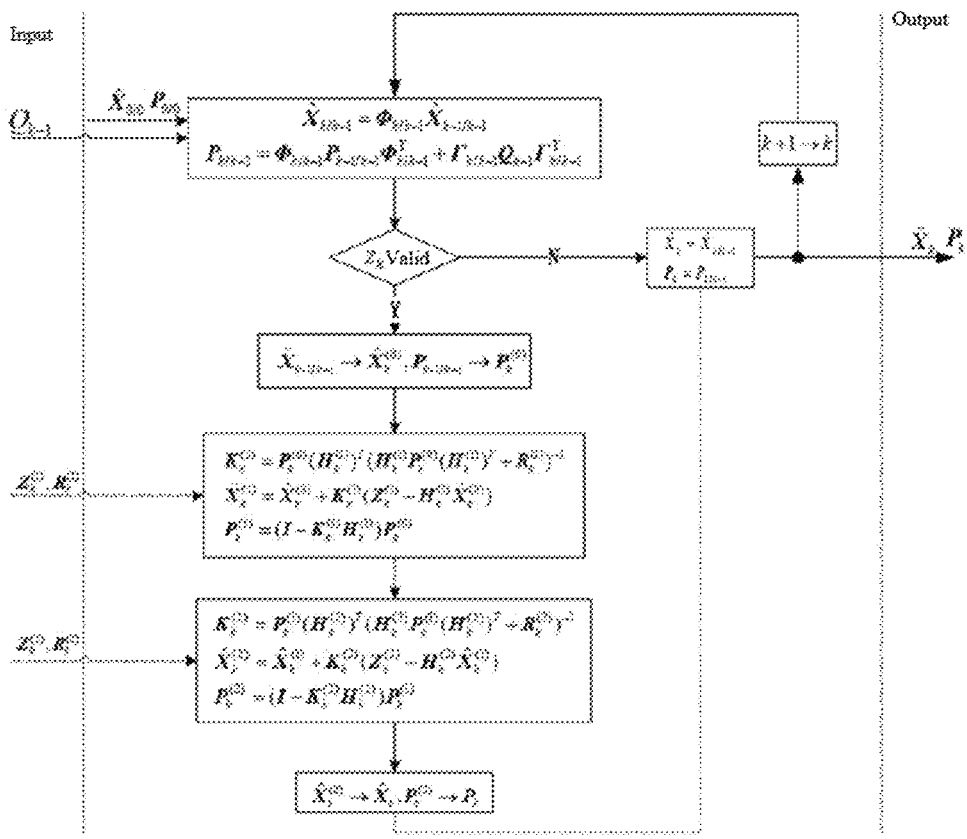
FIG. 8 is a flow chart of a sequential processing method of a two-position Kalman algorithm according to an embodiment of the present invention.

The flow of GMD two-position fine alignment using sequential processing is shown in FIG. 8. The effective interpretation of $Z_k$ in FIG. 8 is to judge the validity of the measurement data (equations (4.4) and (4.8)), that is, to set the criteria of sensing velocity or sensing angular rate to judge whether the drill collar is in a static state or whether to ensure that its slight disturbance does not affect the alignment accuracy. After updating the state variables, when the GMD probe is in a static or slightly disturbed state, whether the observation is valid or not is automatically judged by the collected data of accelerometer and gyroscope in a period of time, and the velocity measurement $Z_v$ update and angular rate measurement $Z_\omega$ update are respectively completed according to sequential processing, and the Kalman gain is calculated to achieve the optimal estimation of constant drift errors of X and Y horizontal gyroscopes and estimation of the constant drift error of the Z-axis gyroscope (the optimal estimation of constant drift error of the gyroscopes is reflected in drift errors of $\varepsilon_0^b$ and $\nabla_0^b$ of gyroscopes and accelerometers contained in state matrix X), and finally complete the optimal estimation of the attitude and azimuth misalignment angle.

The final result of the optimal estimation under the valid measurement equation is equation (5.6), and equation (5.7)

is the evaluation of estimation effect after estimation. Equations (5.3) to (5.7) are an estimation process and a recursive process.

After GMD system detects the instruction of stopping drilling and finding north, it starts the mode of finding north (initial alignment). The basic flow of Kalman two-position alignment algorithm is as follows:

1) at the initial position 1, completing the coarse alignment within 20 s by adopting an analytical coarse alignment algorithm, 2) taking the horizontal attitude angle and azimuth angle after the coarse alignment as the initial values of Kalman filter, carrying out 130 s of fine alignment and drift measurement of the inertial instrument at position 1, estimating the inertial instrument error and misalignment angle error, and then entering the navigation state with the results of this alignment as the initial values, in East-North-Up geographic coordinate system, the defined horizontal attitude angles, i.e., the pitch angle and roll angle, correspond to the well inclination angle and tool face angle for drilling measurement. The defined azimuth angle, i.e., the azimuth angle in East-North-Up geographic coordinate system, corresponds to the azimuth angle and the included angle between the geographical north direction therebetween in drilling measurement terms, 3) on the premise of ensuring that the position changing angular rate is less than the maximum measuring range of the Z-axis gyroscope, completing the position change by 180° within 20 s, changing to position 2, and updating the attitude and velocity navigation data at the same time, 180° is preferred, but the present invention is not only applicable to the position change by 180°, but to arbitrary position, 4) carrying out of fine alignment at position 2 for 130 s, estimating the horizontal attitude and azimuth error angle and completing the drift measurement of the inertial instrument, there are many ways to realize drift measurement in this field, which will not be repeated here.

Figure 9:
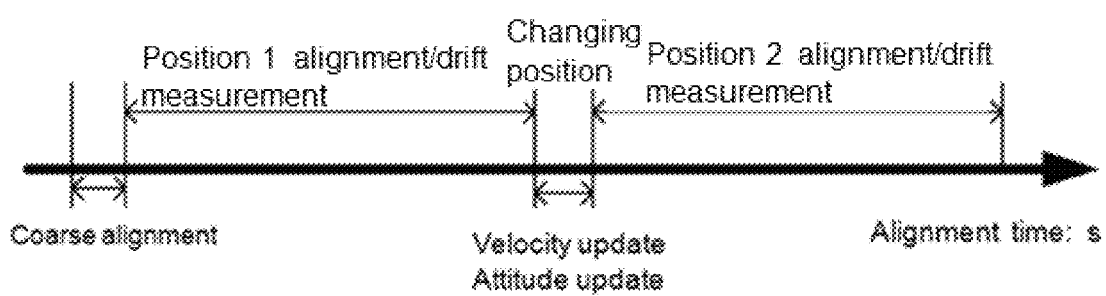
FIG. 9 is a schematic diagram of a two-position+Kalman alignment process according to an embodiment of the present invention.

The whole alignment process can be completed in about 300 s, and the flow is shown in FIG. 9.

The process of the fine alignment is as follows:

Step 1: the attitude update and velocity update are performed, taking the pitch angle, roll angle and yaw angle (corresponding to the well inclination angle, tool face angle and azimuth angle in drilling) of the coarse alignment as initial values, adopting the navigation algorithm to update the velocity and attitude.

1.1 the algorithm for attitude update is as below:

In order to understand attitude update and velocity update more simply, the basic algorithms are listed here. In fact, as a navigation algorithm, attitude update and velocity update belong to the prior art, and the general physical and mathematical methods are given here:

A quaternion method: quaternion is a mathematical method, which is used as a convenient tool for describing coordinate system transformation relationship and solving an attitude matrix in a strapdown inertial navigation system.

According to Euler's one-rotation theorem when a rigid body moves around a fixed point, the limited rotation of a rigid body from one position to another can be realized by one rotation by a certain angle around an axis passing through the fixed point, and the one rotation can be expressed by the following unit quaternion:

$$q = \cos\frac{\alpha}{2} + \xi\sin\frac{\alpha}{2} = q_0 + q_1 i_b + q_2 j_b + q_3 k_b$$

The angle $\alpha$ in q in a quaternion represents the angle of one rotation, the vector $\xi$ represents the azimuth of the rotating axis of one rotation, and the direction of $\xi$ is taken as the positive direction of the rotation angle $\alpha$ according to the right-hand rule.

The relationship between the quaternion and attitude matrix $C_b^n$ is:

$$C_b^n = \begin{bmatrix} q_0^2 + q_1^2 + q_2^2 + q_3^2 & 2(q_3q_2 - q_0q_3) & 2(q_0q_2 + q_1q_3) \\ 2(q_0q_2 - q_0q_3) & q_0^2 + q_1^2 + q_2^2 + q_3^2 & 2(q_2q_3 - q_0q_1) \\ 2(q_1q_3 - q_0q_2) & 2(q_0q_1 - q_2q_3) & q_0^2 + q_1^2 + q_2^2 + q_3^2 \end{bmatrix} \quad (a)$$

Therefore, given the quaternions $q_0$, $q_1$, $q_2$ and $q_3$ of rotation of a body, the transition matrix $C_b^n$ from a body coordinate system to a navigation coordinate system can be obtained, thus the navigation calculation of the strapdown inertial navigation system can be carried out.

The quaternion differential equation is established by the angular rate $\tilde{\omega}^b$ measured by the body coordinate system b system:

$$\dot{q}(t) = \frac{1}{2}q(t) \cdot \tilde{\omega}^b \quad (b)$$

The quaternion can be obtained by obtaining the angular rate vector of the body in real time, and the attitude and azimuth information, $\theta$, $\gamma$ and $\varphi$, of the body can be obtained according to formula (a).

When solving formula (b), it is a differential equation, and it is necessary to obtain the initial values of the quaternion, i.e., $q_0(0)$, $q_1(0)$, $q_2(0)$ and $q_3(0)$. The initial values of azimuth and attitude obtained by coarse alignment are defined as: $\theta_0$, $\gamma_0$ and $\varphi_0$.

The initial quaternion can be obtained as follows:

$$\begin{bmatrix} q_0(0) \\ q_1(0) \\ q_2(0) \\ q_3(0) \end{bmatrix} = \begin{bmatrix} \cos\frac{\theta_0}{2}\cos\frac{\varphi_0}{2}\cos\frac{\gamma_0}{2} + \sin\frac{\theta_0}{2}\sin\frac{\varphi_0}{2}\sin\frac{\gamma_0}{2} \\ \cos\frac{\theta_0}{2}\cos\frac{\varphi_0}{2}\sin\frac{\gamma_0}{2} - \sin\frac{\theta_0}{2}\cos\frac{\varphi_0}{2}\cos\frac{\gamma_0}{2} \\ \cos\frac{\theta_0}{2}\cos\frac{\varphi_0}{2}\cos\frac{\gamma_0}{2} + \sin\frac{\theta_0}{2}\cos\frac{\varphi_0}{2}\sin\frac{\gamma_0}{2} \\ \sin\frac{\theta_0}{2}\cos\frac{\varphi_0}{2}\cos\frac{\gamma_0}{2} - \cos\frac{\theta_0}{2}\cos\frac{\varphi_0}{2}\sin\frac{\gamma_0}{2} \end{bmatrix}$$

By recursively solving the quaternion differential equation (b), the quaternion of the body can be obtained and updated continuously, so as to obtain the attitude transition matrix of the body and calculate the attitude and azimuth information, $\theta$, $\gamma$ and $\varphi$, of the body in real time.

The body here is the drill collar assembly that needs to be measured by a GMD.

1.2 The velocity update algorithm is:

the velocity differential equation, i.e., the specific force equation, is the basic relational expression of an inertial navigation solution:

$$\dot{v}^n = C_b^n f^b - (2\omega_{ie}^n + \omega_{en}^n) \times v^n + g^n \quad (5.8)$$

where, $g^o = [0 \ 0 \ -g]^T$, which is the projection of acceleration of gravity in a navigation coordinate system.

In the equation, $f^b$ refers to the three-component value of the body coordinate system of b system measured by an accelerometer in real time. In equation (5.8), all parameters are vectors.

$\omega_{ib}^b$ indicates the component of the rotational angular rate of the b system relative to the i system in the b system, $\omega_{in}^n$ indicates the component of the rotational angular rate of the n system relative to the i system in the n system, and $$\omega_{ie}^n = \begin{bmatrix} 0 & \omega_{ie}\cos L & \omega_{ie}\sin L \end{bmatrix}^T$$

$$\omega_{en}^n = \begin{bmatrix} -\dfrac{v_N}{R_M + h} & \dfrac{v_E}{R_N + h} & \dfrac{v_N \tan L}{R_N + h} \end{bmatrix}^T$$

where, $v_E$ and $v_N$ are east and north velocities, L and h are latitude and height;

$\omega_{ie}$ is the angular rate of the earth rotation.

Given the latitude L, the meridian circle curvature radius $R_M$ and prime vertical circle curvature radius $R_N$ can be calculated as follows:

$$R_M = \frac{R_e(1-f)^2}{[1-(2-f)f\sin^2 L]^{\frac{3}{2}}},$$

$$R_N = \frac{R_e}{[1-(2-f)f\sin^2 L]^{\frac{1}{2}}}.$$

The oblateness f is defined by China Geodetic Coordinate System 2000 (CGCS2000) ellipsoid standard or World Geodetic System-1984 Coordinate System (WGS-84) ellipsoid standard.

Step 2, Kalman filter is carried out, the specific algorithm is divided into two parts: time update and measurement update.

2.1 Attitude update: the quaternion updated in the attitude update algorithm of 1.1 is substituted into the attitude transition matrix $C_b^n$ to update the F matrix and W matrix in the Kalman state equation (4.2), thus realizing the attitude update of Kalman.

The b system is fixedly connected with an IMU and rotates with the body. The origin is located at the sensing center of the position of the IMU, which is expressed by $ox_b y_b z_b$, and the angular position relationship between b system and n system is expressed by an attitude matrix $C_n^b$. The attitude transition matrix of a navigation coordinate system and a body coordinate system is as follows:

$$C_b^n = \begin{bmatrix} \cos\psi\cos_y + \sin\psi\sin\theta\sin_y & \sin\psi\cos\theta & \cos\psi\sin_y - \sin\psi\sin\theta\cos_y \\ -\sin\psi\cos_y + \cos\psi\sin\theta\sin_y & \cos\psi\cos\theta & -\sin\psi\sin_y - \cos\psi\sin\theta\cos_y \\ -\cos\theta\sin_y & \sin\theta & \cos\theta\cos_y \end{bmatrix}.$$

2.2 Time update: the specific update equations are one-step state prediction equation and one-step prediction mean square error equation;

One-step state prediction equation (5.3): $\hat{X}_{k/k-1} = \Phi_{k/k-1}\hat{X}_{k-1/k-1}$, One-step prediction mean square error equation (5.4): $P_{k/k-1} = \Phi_{k/k-1}P_{k-1/k-1}\Phi_{k/k-1}^T + \Gamma_{k/k-1}Q_{k-1}\Gamma_{k/k-1}^T$, $\Phi_{k/k-1}$ is the discretization of the 12×1-dimension one-step state transition matrix F, and $\Gamma_{k/k-1}$ is a system noise distribution matrix.

Time update is only an update of 12 state variables of calculation state variables under the real-time data collected by different gyroscopes and accelerometers, but the measurement data is not used at this time. Measurement update is to use the measurement data to correct the error of state update and realize the optimal estimation (azimuth and horizontal attitude, drifts of the gyroscope and accelerometer, i.e., 9 of 12 variables).

2.3 Measurement update:

2.3.1 Firstly, a criterion is set to judge whether the measurement data value is valid. The validity of the measurement data value can be judged by judging whether the drill collar is in a static state or whether the external disturbance does not affect the alignment accuracy. Only when the measurement data value is valid, measurement update is carried out; otherwise, measurement update is not carried out, but only time update is carried out. That is, the update result of one-step state prediction equation or one-step prediction mean square error equation in the time update is taken as the output of Kalman filter (that is, the horizontal attitude information and azimuth information at this time are output from equation (5.3)/(5.4)). The setting for judging whether the drill collar is in a static state can be as follows: the observed sensing velocity observation (such as an acceleration value) or sensing angular rate observation (such as a root mean square value of the gyroscope angular rate) is set, and when the value is less than a certain value, measurement update is carried out. If always unsatisfied, no measurement update will be made, only time update will be made. The criterion of external disturbance can be whether the external mud disturbance or the measured value of a vibration sensor is less than the set threshold. If so, the alignment accuracy is not affected and the measurement is updated; otherwise, the measurement update is not made but only the time update is made.

2.3.2 Measurement Update

Measurement equations (4.4) and (4.8) are a velocity measurement based on zero-velocity constraint and an angular rate measurement based on earth rotation angular rate constraint respectively.

The two kinds of measurements are subject to sequential processing, that is, the measurement update equations (i.e., equations (5.5), (5.6) and (5.7)) are executed respectively.

The state estimation equation (5.6) is the final optimal estimated Kalman filter value, which includes the mathematical platform misalignment angle $\varnothing^n$ of the strapdown inertial navigation, the gyro constant drift $\varepsilon_0^b$ and the accelerometer constant bias $\nabla_0^b$. Equation (5.7) is the evaluation of estimation effect after estimation.

6: Simulation Test and Analysis of the Two-Position Kalman Alignment Algorithm

The initial position is set as [116° E, 40° N, 100 m]. The parameters of a high-temperature inertial instrument are shown in Table 1. The simulation process is the same as the analytical two-position alignment method. In a well inclination angle of 0-90°, one position is taken for simulation at every 5°. There are 19 positions in total. 40 Monte-Carlo simulations are performed at each position and the root mean square value is taken. The simulated well trajectory direction is divided into south-north direction and east-west direction. The azimuth alignment error under different well inclination angles and the ability of inertial instrument to measure a drift are analyzed.

Figure 10:
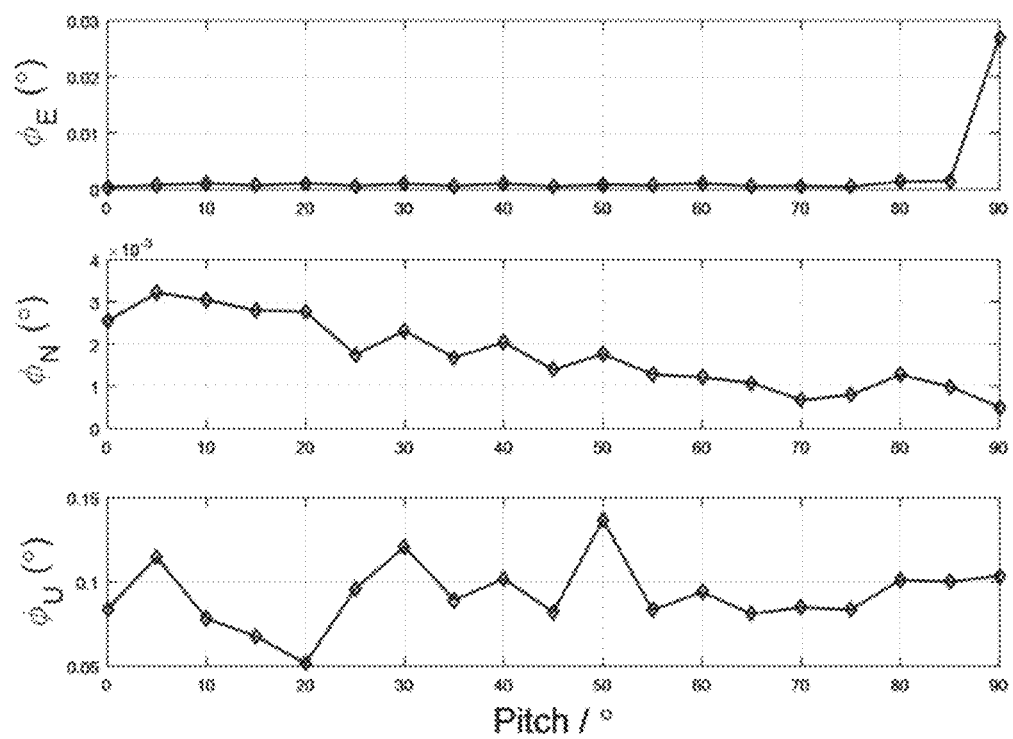
FIG. 10 is a curve graph of misalignment angle errors of a south-north well trajectory during bias correction by a two-position+Kalman alignment method according to an embodiment of the present invention.
Figure 11A:
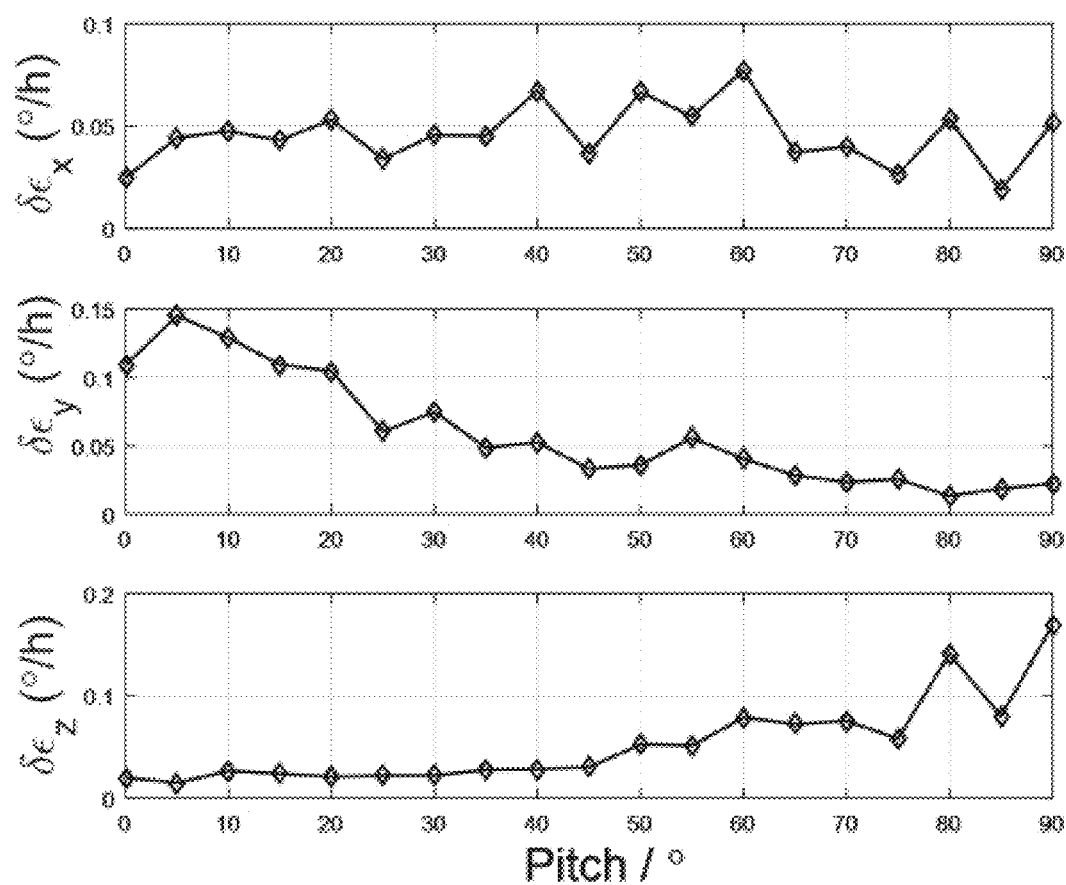
FIG. 11A is a diagram of a gyroscope drift estimation error of a south-north well trajectory during bias correction by a two-position+Kalman alignment method according to an embodiment of the present invention.
Figure 11B:
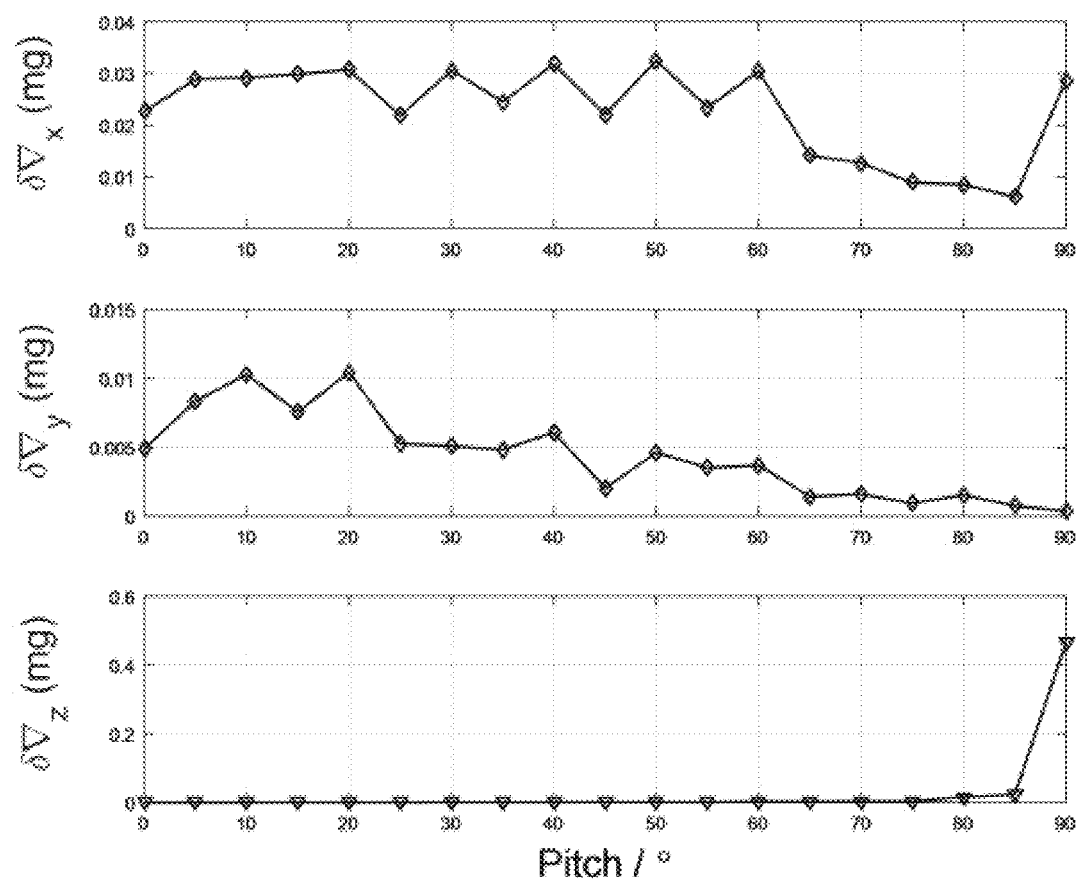
FIG. 11B is a diagram of a gyroscope drift estimation error of a south-north well trajectory during bias correction by a two-position+Kalman alignment method according to an embodiment of the present invention.

Simulation 1: the well trajectory is south-north direction, and the vertical well attitude is [0°, 0°, 0°] and the horizontal well attitude is [90°, 0°, 0°] in the geographic coordinate system. FIG. 10 is a curve of misalignment angle errors, and FIG. 11 is the constant drift estimation errors of the gyroscope and accelerometer respectively.

It can be seen from FIG. 10 that the azimuth measurement accuracy remains basically unchanged under different well inclination angles for the well trajectory in the south-north direction, and the related mechanism analysis is similar to the analytical two-position alignment, that is, the horizontal-axis gyroscope can always be modulated by the position changing mechanism in the south-north direction, and its constant drift can always be observed, and the azimuth alignment accuracy mainly depends on the angular random walk of the gyroscope. 40 Monte-Carlo simulations are carried out at each position in FIG. 10, and the root mean square value is taken. The standard deviation of an azimuth misalignment angle σ3 aligned in a full attitude from a vertical well to a horizontal well is calculated as 0.0576°, which fully meets the design requirement for azimuth measurement accuracy of 1°.

Simulation 2: the well trajectory is east-west direction, with a vertical well attitude [0°, 0°, 90°] and a horizontal well attitude [90°, 0°, 90°] in the geographic coordinate system. The following simulations of alignment accuracy and drift measurement ability are carried out respectively under situations of a vertical section, a small well inclination angle and a large well inclination angle, and finally the simulation conclusions of alignment accuracy and drift measurement ability under different well inclination angles and different directions are obtained.

1) In a Simulation Analysis of a Vertical Well Section, an Initial Attitude Angle is Set as [0°, 0°, 90°].

Figure 12:
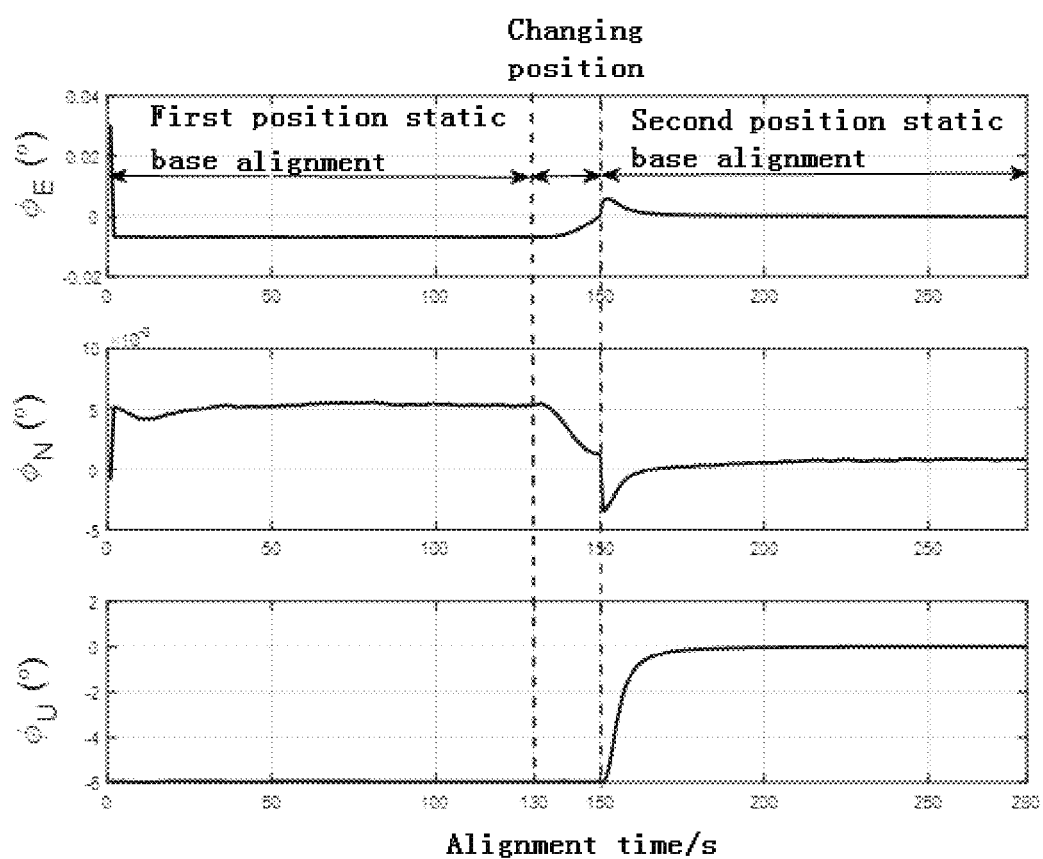
FIG. 12 is a curve graph of misalignment angle errors of a vertical well during bias correction by a two-position+Kalman alignment method according to an embodiment of the present invention.
Figure 13A:
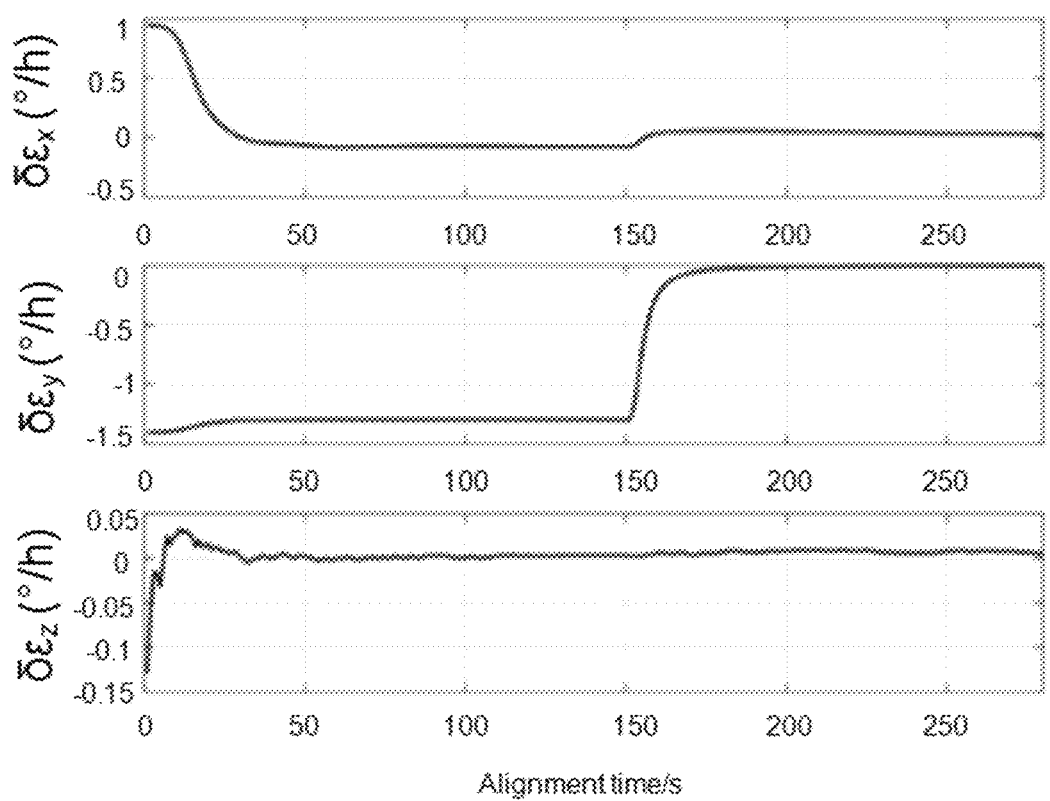
FIG. 13A is a curve graph of gyroscope drift estimation errors in a vertical well during bias correction by a two-position+Kalman alignment method according to an embodiment of the present invention.
Figure 13B:
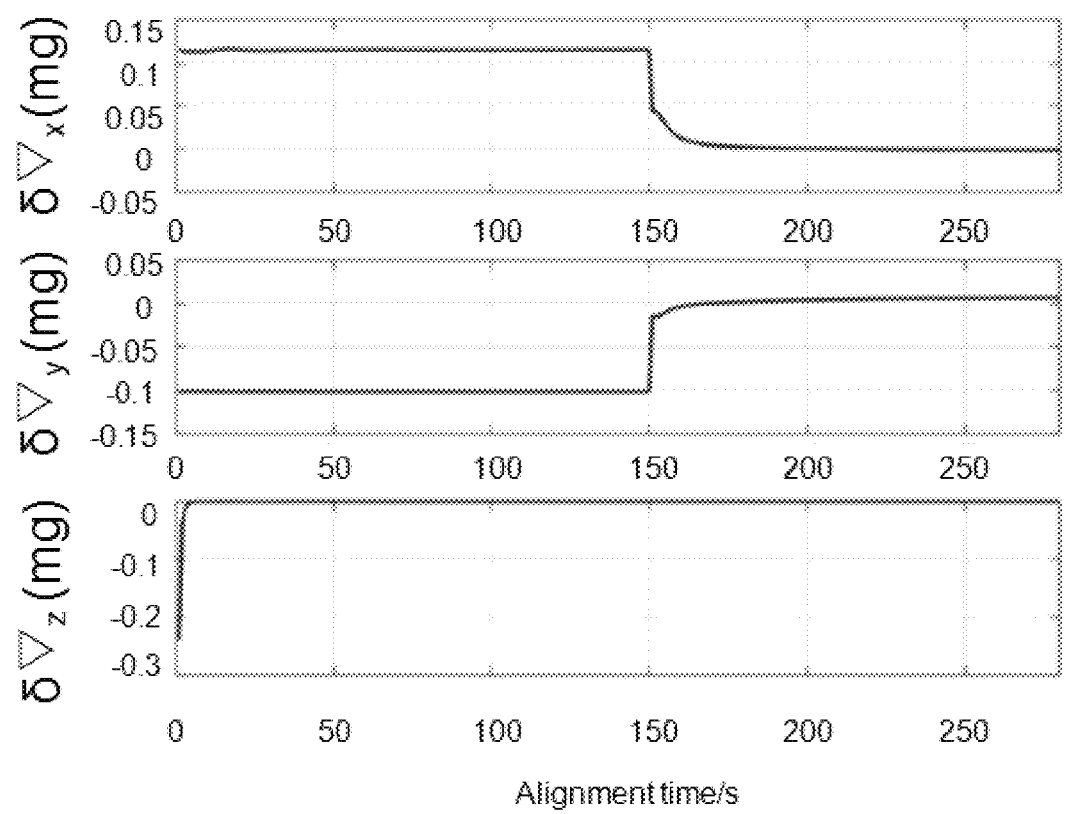
FIG. 13B is a curve graph of accelerometer drift estimation errors of a vertical well during bias correction by a two-position+Kalman alignment method according to an embodiment of the present invention.

FIG. 12 is a curve of simulated misalignment angles, and FIG. 13 is a curve of constant drift estimation errors of an accelerometer (b) and a gyroscope (a). After changing the position by 180°, the constant drift error of inertial instrument is quickly eliminated, thus eliminating the alignment error between the horizontal attitude and azimuth. The final simulation results show that the final azimuth misalignment angle estimation error is −0.1°, and the misalignment angle is only related to the random drift error of the inertial instrument.

2) Simulation Analysis of an East-West Inclined Well Section

Figure 14A:
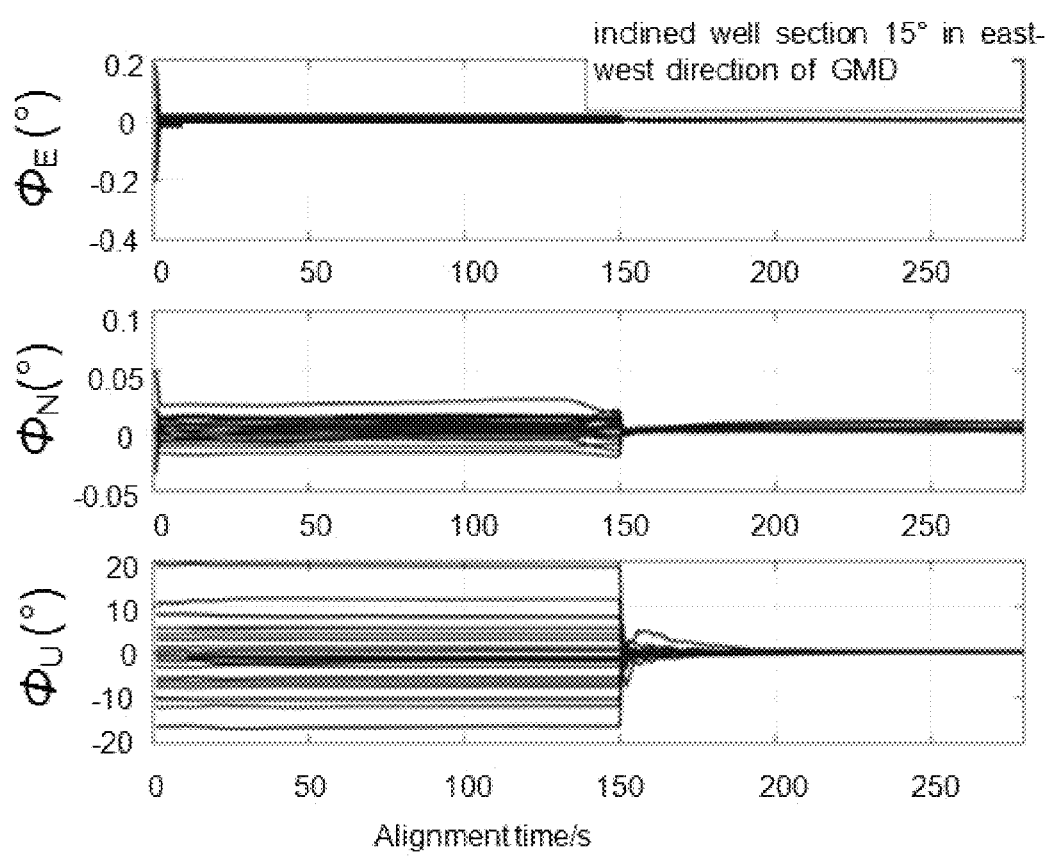
FIG. 14A is a curve graph of small well inclination misalignment angle estimation errors of an east-west well trajectory during bias correction by a two-position+Kalman alignment method according to an embodiment of the present invention.
Figure 14B:
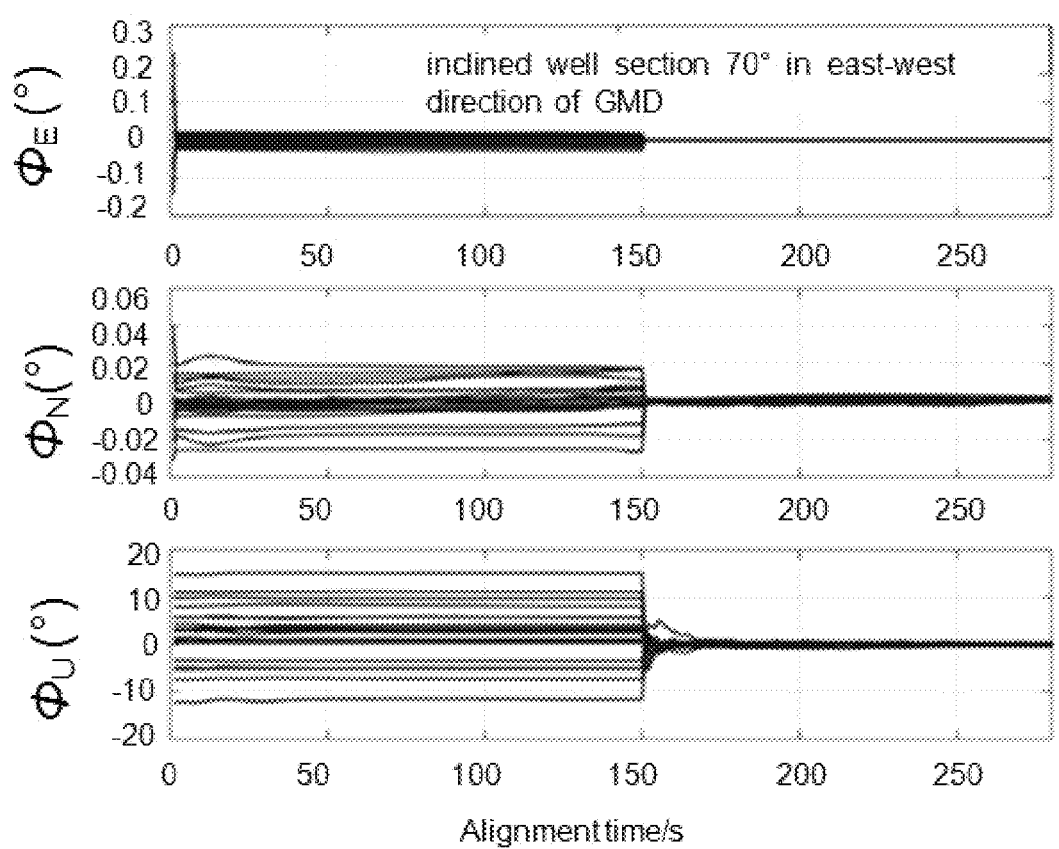
FIG. 14B is a curve graph of large well inclination misalignment angle estimation errors of an east-west well trajectory during bias correction by a two-position+Kalman alignment method according to an embodiment of the present invention.

In the simulation experiment of a two-position analytical alignment, FIG. 4 shows that when the well inclination angle is greater than 10°, the accuracy error of azimuth alignment exceeds the design index of 1°. In this simulation, a small well inclination angle of 15°, i.e., an initial attitude angle of [15°, 0°, 90°], and a large well inclination angle of 70°, i.e., an initial attitude angle of [70°, 0°, 90°], are set respectively. The results of 20 Monte-Carlo simulation are shown in FIGS. 14(a) and 14(b).

It can be seen from FIG. 14 that, regardless of a small well inclination angle or a large well inclination angle, the attitude and azimuth misalignment angle errors can converge rapidly after changing the position by 180°. At a small well inclination angle of 15°, the azimuth misalignment angle average value at the end of alignment is −0.0072° and the standard deviation value of 3σ is 0.4°, and at a large well inclination angle of 70°, the azimuth misalignment angle average value at the end of alignment is 0.1° and the standard deviation value of 3σ is 0.9°, both of which meet the azimuth accuracy requirement of 1°.

Figure 15A:
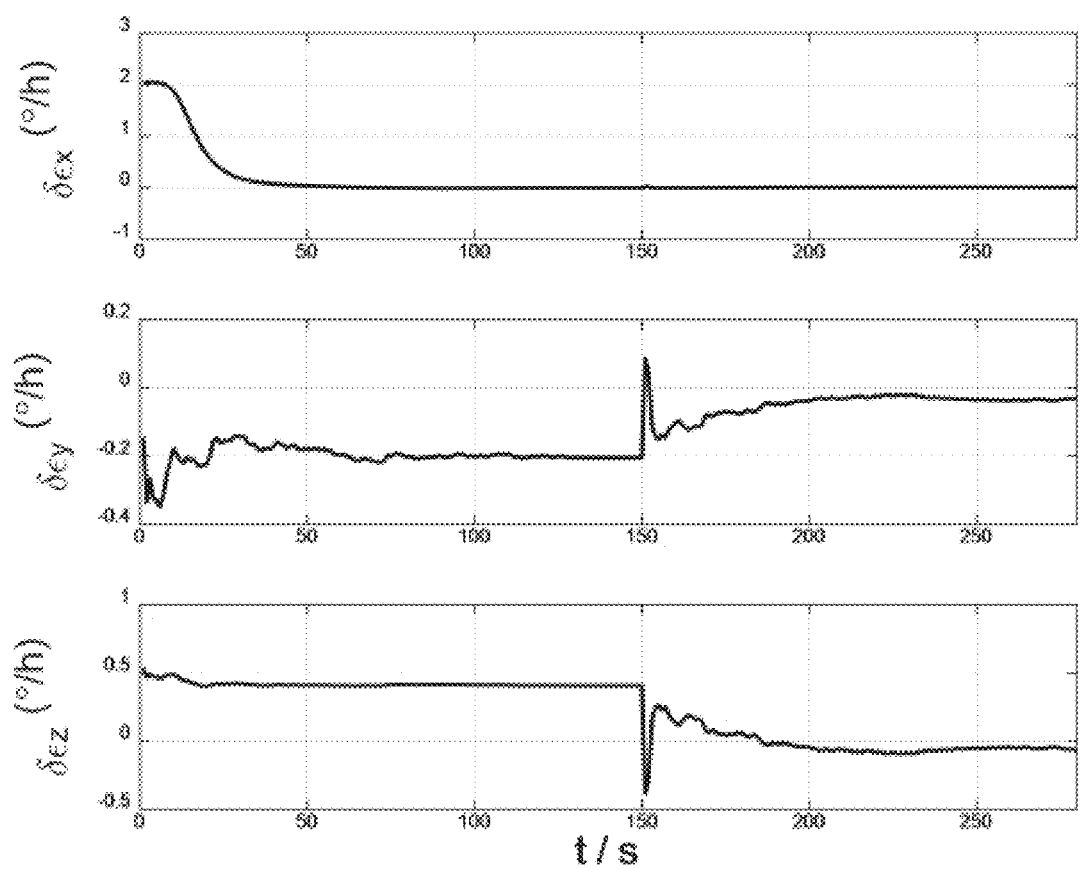
FIG. 15A is a graph of a constant drift estimation error of a gyroscope under a large well inclination angle of 70° in an east-west well trajectory during bias correction by a two-position+Kalman alignment method according to an embodiment of the present invention.
Figure 15B:
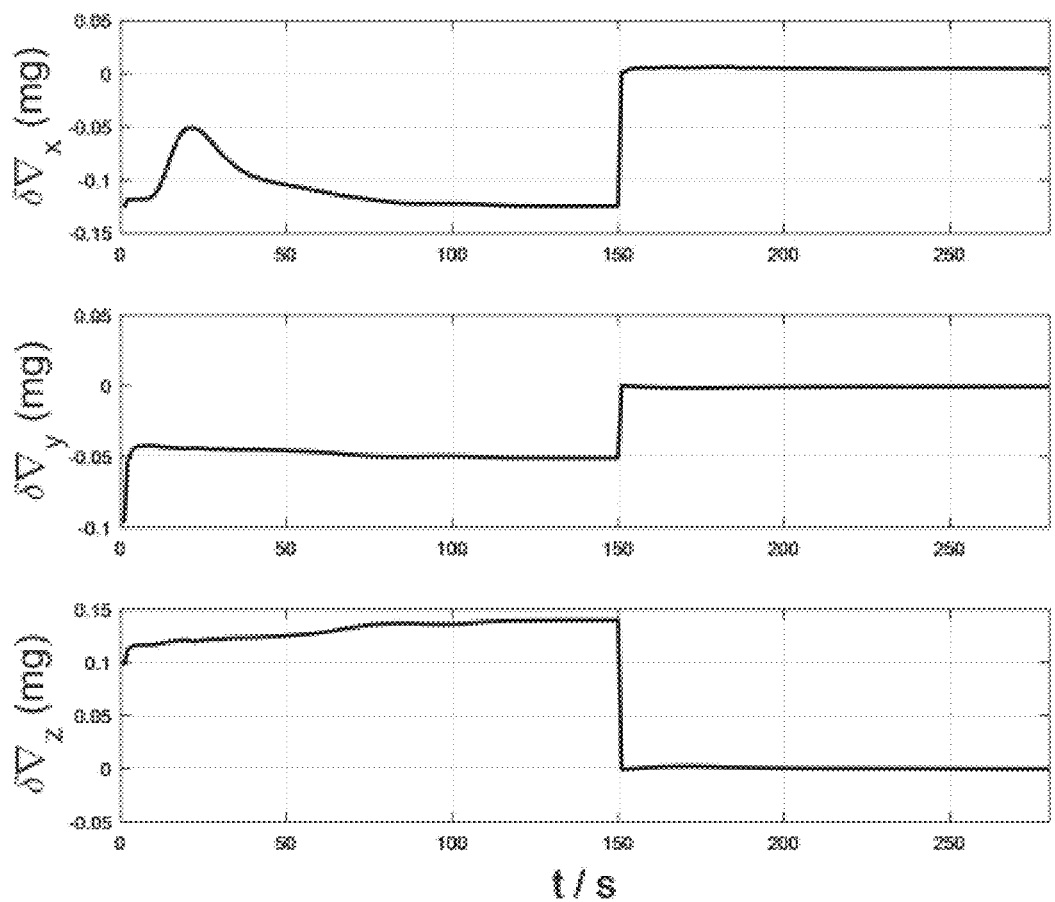
FIG. 15B is a graph of a constant drift estimation error of an accelerometer under a large well inclination angle of 70° in an east-west well trajectory during bias correction by a two-position+Kalman alignment method according to an embodiment of the present invention.

FIGS. 15(a) and 15(b) show a simulation result of inertial instrument drift estimation at a large well inclination angle of 70°. When the final alignment is finished, the constant drift estimation error of the gyroscope (corresponding to FIG. 15(a)) is [0.01, −0.02, −0.05] deg/h, and the constant drift estimation error of the accelerometer (corresponding to FIG. 15(b)) is [4.6, −0.5, −0.05] ug. At a large well inclination angle of 70°, the constant drift of inertial instruments can still be accurately estimated by Kalman optimal estimation. Therefore, the algorithm designed in this text can still achieve an azimuth error less than 1° in the east-west direction at a large inclination of 70° under the condition that the current high-temperature gyroscope has a repeatability error of 2°/h.

3) in the azimuth accuracy analysis under a full well inclination angle, the well inclination angle is set to be in a range of 0-90° for the stimulation, and the simulation is performed every 5° of the well inclination angle, each position includes 40 Monte-Carlo simulations, and the root mean square values of data of 40 azimuth misalignment angles are taken at the end of alignment.

Figure 16:
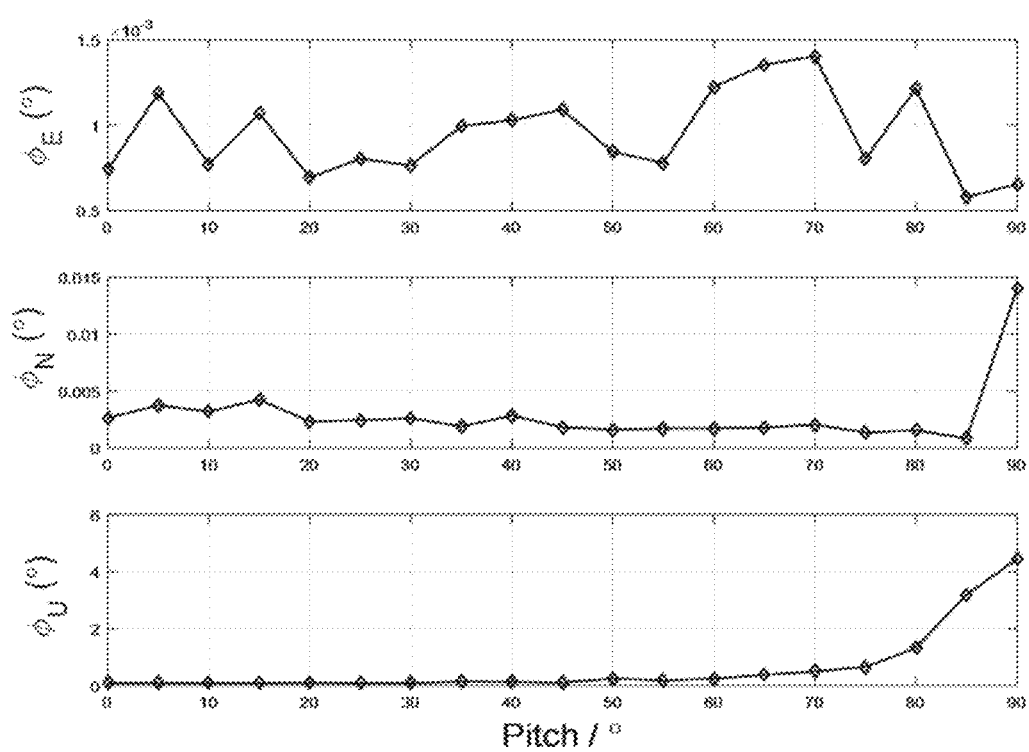
FIG. 16 is a simulation graph of a GMD alignment misalignment angle error under a full well inclination angle in an east-west well trajectory during bias correction by a two-position+Kalman alignment method according to an embodiment of the present invention.

It can be seen from FIG. 16 that by adopting the optimal estimation of two-position Kalman+velocity measurement based on zero velocity and angular rate measurement based on earth rotation angular rate constraint proposed in this text, azimuth alignment accuracy better than 1° can be maintained when the well inclination angle is less than 70° in east-west well trajectory condition, and azimuth measurement accuracy better than 5° can be achieved in a whole horizontal well section, and the results are far better than that of the two-position analytical method shown in FIG. 4.

Figure 17A:
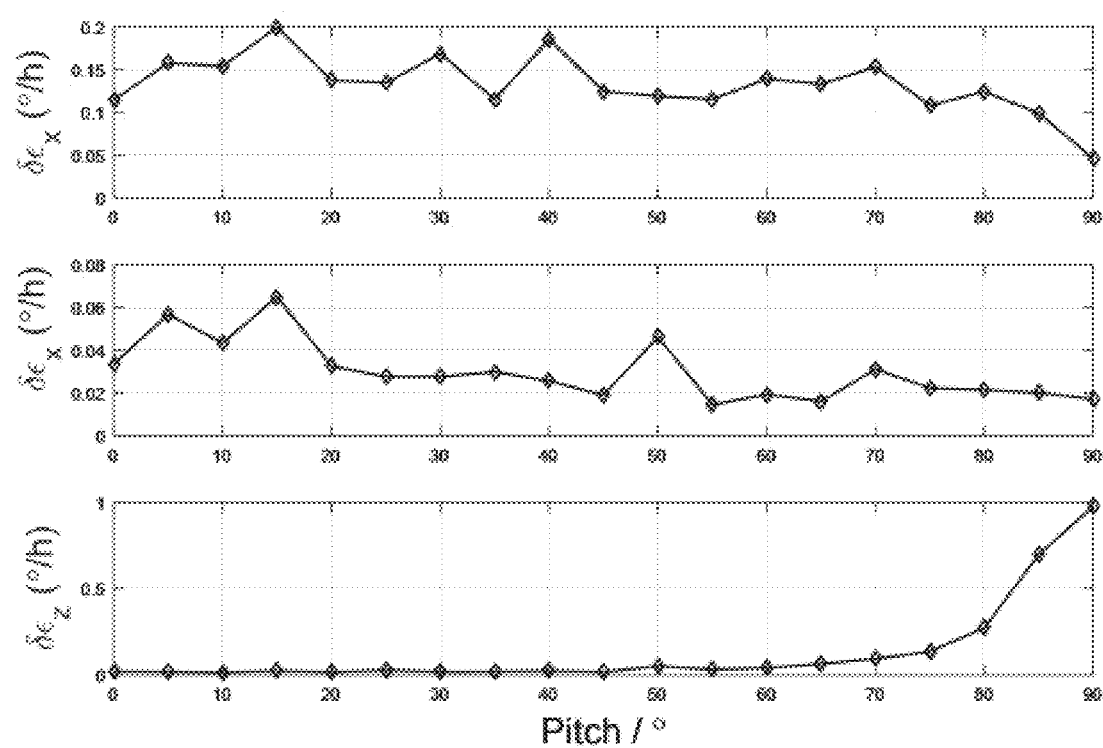
FIG. 17A is a curve graph of constant drift estimation errors of a gyroscope under a full well inclination angle in an east-west well trajectory during bias correction by a two-position+Kalman alignment method according to an embodiment of the present invention.
Figure 17B:
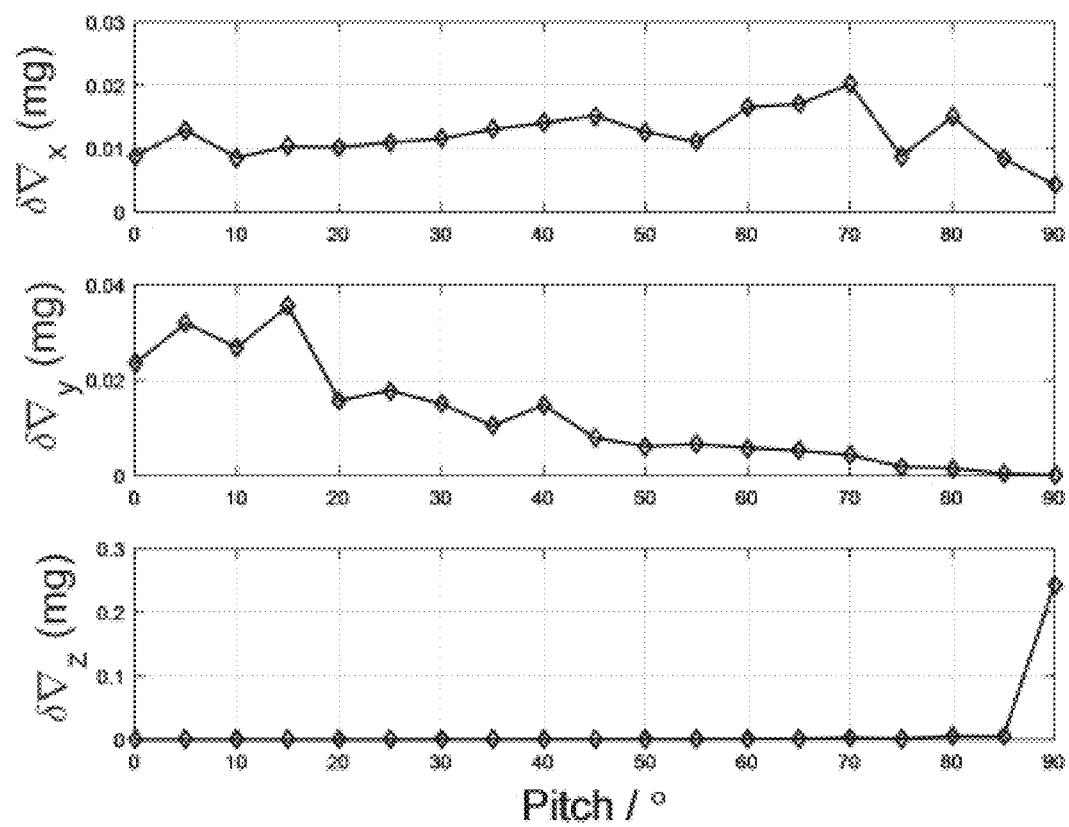
FIG. 17B is a curve graph of constant drift estimation errors of an accelerometer under a full well inclination angle in an east-west well trajectory during bias correction by a two-position+Kalman alignment method according to an embodiment of the present invention.

It can also be seen from FIG. 17 that the drift error of a Z-axis gyroscope can guarantee an estimation accuracy of better than 0.2 deg/h in a vertical well section (0°) to the east-west large well inclination angle (75°), and the estimation accuracy deteriorates when the drift error is close to the horizontal well (90°), but estimation accuracy of 1 deg/h can also be guaranteed. Therefore, the method of the present invention can well estimate the drift error of the X/Y gyroscope from the vertical well section to the horizontal well section, and can satisfy the drift error estimation accuracy of the Z-axis gyroscope at a large well inclination angle in the east-west horizontal well direction.

The alignment method of multi-position+position changing strapdown solution+Kalman+velocity measurement after zero-speed correction and angular rate measurement constrained by the earth rotation angular rate is particularly suitable for a strapdown inertial navigation system adopting a Coriolis vibratory gyroscope. The accuracy of the Coriolis vibratory gyroscope mainly depends on the processing accuracy, isotropy uniformity and control circuit accuracy of the resonator. However, due to the actual influence of processing technology, the processing accuracy and material uniformity of the resonator cannot reach the perfect level, which will inevitably lead to the angular rate estimation error of the resonator gyroscope and the azimuth alignment error of the strapdown inertial navigation system. According to the method provided by the present invention, aiming at the drift error of gyroscopes, especially Coriolis vibratory gyroscopes, the velocity measurement after zero-speed correction and the angular rate measurement constrained by the earth rotation angular rate are adopted for measurement update, and the strapdown solution algorithm in the position changing process is combined, so that the optimal estimation of the drift error of the gyroscope can be realized, and the azimuth measurement accuracy of the GMD system is improved.

The method of the present invention is applied to an inertial navigation system, and the inertial navigation system includes a triaxial gyroscope, a triaxial accelerometer and a shock absorber, wherein the gyroscope is fixedly connected with the shock absorber, the triaxial gyroscope is arranged at 90 degrees or other angles to each other. The inertial navigation system is a strapdown inertial navigation system.

An application of the attitude measurement method is to apply the measurement method to the north-finding process of a Coriolis vibratory gyroscope to realize the initial alignment of the gyroscope. The Coriolis vibratory gyroscope applied in a Measurement While Drilling (MWD) system.

The attitude measurement method of the present invention can also be applied to a multi-point gyrocompass measurement while drilling system or a multi-point gyrocompass cable measurement system or a continuous navigation measurement system with the capability of zero-speed correction to realize the attitude measurement of underground wells.

The attitude measurement method provided by the embodiment of this application is described in detail above. The description of the above embodiments is only to facilitate understanding the method and its core idea of the application; at the same time, according to the idea of this application, there will be some changes in the specific implementation and application scope for those skilled in the art. To sum up, the contents of this description should not be construed as limitations of this application. As "comprising" and "including" mentioned in the whole description and claims are open terms, they should be interpreted as "comprising/including but not limited to". "Roughly" means that within an acceptable error range, those skilled in the art can solve the technical problem within a certain error range and basically achieve the technical effect. It should be understood that the term "and/or" used in this text is only a description of the association relationship of associated objects, which means that there can be three kinds of relationships, for example, A and/or B, which can mean that A exists alone, A and B exist at the same time, and B exists alone. In addition, the character "/" in this text generally indicates that the context object is an "or" relationship.

The above description shows and describes several preferred embodiments of the application. It should be understood that the application is not limited to the form disclosed herein, and should not be regarded as an exclusion of other embodiments, but can be used in various other combinations, modifications and environments, and can be modified by the above teaching or the technology or knowledge in relevant fields within the scope of the application conception described herein. However, the modifications and changes made by those skilled in the art do not depart from the spirit and scope of this application, and should be within the claimed scope of the appended claims of this application.

What is claimed is:

1. An attitude measurement method, used for a strapdown inertial navigation system, wherein repeatability drift of a gyroscope is suppressed by adopting a method of performing fine alignment at a plurality of positions respectively; the method comprising:
   S1, taking current attitude data and velocity data of the strapdown inertial navigation system, and performing first fine alignment at a first position of the plurality of positions;
   S2, changing a position of the strapdown inertial navigation system to an nth position of the plurality of positions, and performing attitude update and velocity update according to a result of an (n−1)th fine alignment in a position changing process; and
   S3, taking results of the attitude update and velocity update as nth initial values, and performing an nth fine alignment at the nth position to complete an initial alignment of the strapdown inertial navigation system; wherein, n is incremented by 1, and steps S2 and S3 are repeated until n=k; k is a number of changed positions, and k is equal to 2.

2. The attitude measurement method according to claim 1, wherein the fine alignment is realized by a Kalman algorithm.

3. The attitude measurement method according to claim 2, wherein the fine alignment using the Kalman algorithm comprises: time update and/or measurement update;
   wherein the time update includes updating a state variable according to real-time data collected by the strapdown inertial navigation system, the updating including an attitude update and a velocity update;
   wherein the measurement update includes correcting an error of a state update with measurement data to realize an optimal estimation;
   wherein the Kalman algorithm uses a velocity measurement after zero-speed correction and an angular rate measurement constrained by the earth rotation angular rate for the measurement update and the optimal estimation, so as to eliminate a drift error of the gyroscope.

4. The attitude measurement method according to claim 3, wherein the measurement update comprises the steps of:
   1) judging whether a measurement data value is valid, if the measurement data value is valid, entering step 2), otherwise, performing no update, and taking a result of the time update as a final result of the Kalman algorithm; and
   2) updating a result of the state update according to the measurement data value, calculating a gain coefficient according to an updating result and the result of the time update to obtain optimal state estimation.

5. The attitude measurement method according to claim 4, wherein judging whether the measurement data value is valid is realized by judging whether a drill collar is in a static state and/or whether external disturbance meets an alignment requirement; if the drill collar is in the static state and/or the external disturbance meets the alignment requirement, it is determined that the measurement data value is valid, otherwise, it is determined that the measurement data value is invalid.

6. The attitude measurement method according to claim 5, wherein
   judging whether the drill collar is in the static state comprises: judging whether a sensing-velocity observation value and/or a sensing-angular-rate observation value is less than a judgment threshold; if the sensing-velocity observation value and/or the sensing-angular-rate observation value is less than the judgment threshold, judging that the drill collar is in the static state; otherwise, judging that the drill collar is not in the static state.

7. The attitude measurement method according to claim 5, wherein, judging whether the external disturbance meets the alignment requirement comprises: judging whether a disturbance amount of external mud or a vibration amount sensed by a vibration sensor is less than a set threshold value; if the disturbance amount of external mud or the vibration amount sensed by the vibration sensor is less than the set threshold value, judging that the external disturbance amount meets the alignment requirement, otherwise, judging that the external disturbance amount does not meet the alignment requirement.

8. The attitude measurement method according to claim 4, wherein the step 2) comprises: respectively solving a measurement matrix composed of a velocity measurement $Z_v$ after zero-speed correction and an angular rate measurement $Z_\omega$ constrained by the earth rotation angular rate, so as to realize constant drift error optimal estimation of X and Y horizontal gyroscopes and constant drift error estimation of a Z-axis gyroscope, and finally complete optimal estimation of an attitude and azimuth misalignment angle.

9. The attitude measurement method according to claim 3, wherein one-step state prediction and one-step mean square error prediction are completed during the time update.

10. The attitude measurement method according to claim 3, wherein the attitude update in the position changing process is carried out by a quaternion method.

11. The attitude measurement method according to claim 1, wherein the attitude measurement method further comprises performing coarse alignment at the first position, and performing the first fine alignment using a result of the coarse alignment as the first initial values.

12. A measurement while drilling system, comprising a strapdown inertial navigation system which comprises a triaxial gyroscope and a triaxial accelerometer; wherein the strapdown inertial navigation system adopts an attitude measurement method according to claim 1, to suppress a repeatability drift error of the gyroscope and improve accuracy of measurement while drilling in directional drilling.

13. A continuous navigation measurement system, comprising a strapdown inertial navigation system which comprises a triaxial gyroscope and a triaxial accelerometer; wherein the strapdown inertial navigation system adopts an attitude measurement method according to claim 1, to suppress a repeatability drift error of the gyroscope and improve attitude measurement accuracy in a navigation process.

\* \* \* \* \*